(12) United States Patent
Scheefhals et al.

(10) Patent No.: US 12,459,998 B2
(45) Date of Patent: Nov. 4, 2025

(54) ALPHA-SYNUCLEIN BINDING ANTIBODIES, OR ANTIGEN BINDING PORTIONS THEREOF

(71) Applicant: SYNGLE THERAPEUTICS B.V., Soest (NL)

(72) Inventors: Augustinus Petrus Henricus Scheefhals, Soest (NL); Wilbrandt Jannes Wichert Tepper, Soest (NL); Erik Stoops, Zwalm (BE)

(73) Assignee: SYNGLE THERAPEUTICS B.V., Soest (NL)

( * ) Notice: Subject to any disclaimer, the term of this patent is extended or adjusted under 35 U.S.C. 154(b) by 585 days.

(21) Appl. No.: 17/918,048

(22) PCT Filed: Apr. 12, 2021

(86) PCT No.: PCT/NL2021/050238
§ 371 (c)(1),
(2) Date: Oct. 10, 2022

(87) PCT Pub. No.: WO2021/206561
PCT Pub. Date: Oct. 14, 2021

(65) Prior Publication Data
US 2023/0151089 A1 May 18, 2023

(30) Foreign Application Priority Data
Apr. 10, 2020 (NL) ...................................... 2025332

(51) Int. Cl.
*C07K 16/28* (2006.01)
*A61P 25/28* (2006.01)

(52) U.S. Cl.
CPC .............. *C07K 16/28* (2013.01); *A61P 25/28* (2018.01); *C07K 2317/565* (2013.01)

(58) Field of Classification Search
None
See application file for complete search history.

(56) References Cited

FOREIGN PATENT DOCUMENTS

| WO | 2010/069603 | 6/2010 |
|----|-------------|--------|
| WO | 2011/104696 | 9/2011 |
| WO | 2012/177972 | 12/2012 |
| WO | 2014/132210 | 9/2014 |
| WO | 2019/023809 | 2/2019 |

OTHER PUBLICATIONS

International Search Report & Written Opinion, International Application No. PCT/NL2021/050238, mailed Jul. 9, 2021, 16 pages.

(Continued)

*Primary Examiner* — Aurora M Fontainhas
(74) *Attorney, Agent, or Firm* — Casimir Jones, S.C.; Robert A. Goetz

(57) ABSTRACT

The present invention relates to an isolated antibody, or antigen-binding portion thereof, with a higher binding affinity to alpha-synuclein oligomers compared to alpha-synuclein fibrils and/or alpha-synuclein monomers. The invention further describes in vitro and/or ex vivo methods using the isolated antibody, or antigen-binding portion thereof, to detect alpha-synuclein oligomers. The invention further provides a treatment-option for synucleinopathies, or provide a method to diagnose synucleinopathies.

11 Claims, 9 Drawing Sheets
Specification includes a Sequence Listing.

(56) References Cited

OTHER PUBLICATIONS

Emadi et al.: "Isolation of a Human Single Chain Antibody Fragment Against Oligomeric alpha-synculein that inhibits aggregation and prevents alpha-synuclein-induced Toxicity" Journal of Molecular Biology, Academic Press, United Kingdom, vol. 368, No. 4, Apr. 17, 2007, pp. 1132-1144.

Therese Fagerqvist et al: "Monocolonal antibodies selective for [alpha]-synuclein oligomers/protofibrils recognize brain pathology in Lewy body disorders and [alpha]-synuclein transgenic mice with disease-causing A30P mutation" Journal of Neurochemisty, vol. 126, No. 1, Feb. 27, 2013, pp. 131-144.

Mathieu Dondelinger et al: "Understanding the Significance and Implications of Antibody Numbering and Antigen-Binding Surface / Residue Definition" Frontiers in Immunology, vol. 9, Oct. 16, 2018, pp. 1-15.

Apetri M M et al: "Seconday Structure of @a-Synuclein Oligomers: Characterization by Raman and Atomic Force Microscopy" Journal of Molecular Biology, Academic Press, United Kingdom, vol. 355, No. 1, Jan. 6, 2006, pp. 63-71.

Bengoa-Vergniory Nora et al: "Alpha-synuclein oligomers: a new hope" Acta Neuropathologica, Springer Verlag, Berlin, DE, vol. 134, No. 6, Aug. 12, 2017, pp. 819-838.

Stephanie M. Williams et al: "Oligomeric [alpha]-synuclein and -amyloid variants as potential biomarkers for Parkinson's and Alzheimer's diseases" European Journal of Neuroscience, vol. 43, No. 1, Oct. 15, 2015, pp. 3-16.

Fig. 2 cntd.
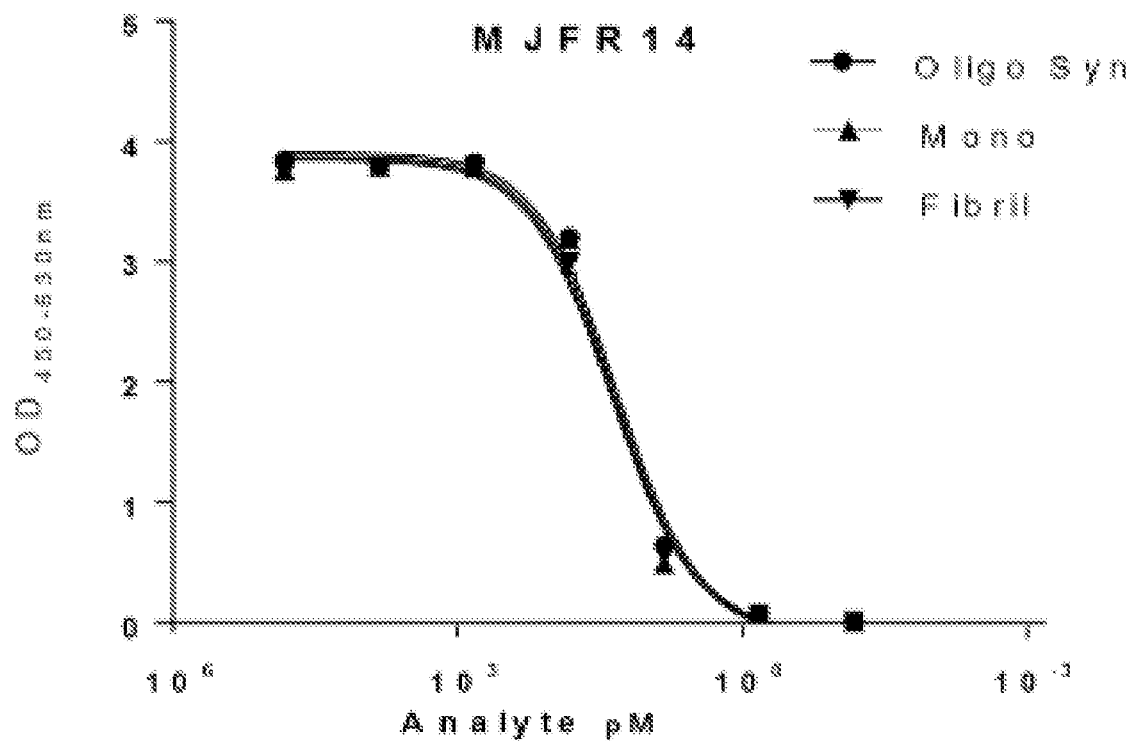

ALPHA-SYNUCLEIN BINDING ANTIBODIES, OR ANTIGEN BINDING PORTIONS THEREOF

FIELD OF THE INVENTION

Present invention relates to novel alpha-synuclein (hereinafter referred to as alpha-Syn) binding antibodies, or antigen-binding portions thereof, showing a higher binding preference and higher binding affinity for alpha-Syn oligomers than for alpha-Syn monomers and/or alpha-Syn fibrils.

BACKGROUND

Alpha-Syn is an intrinsically unstructured monomeric protein with a native unfolded state that is abundantly present in the brain. The protein is believed to be associated with synapses and is most likely involved in neural plasticity, learning and memory. Studies have revealed that alpha-Syn plays a central role in the pathogenesis of several neurodegenerative diseases and that levels of alpha-Syn oligomers and alpha-Syn fibrils in these pathological conditions are elevated as compared to the normal condition of the brain.

Oligomers are formed by oligomerization, a naturally occurring process that converts monomers to multimeric protein complexes. The process generally occurs up to a limited plurality of monomers accumulating into an oligomer. In healthy biological processes oligomerization of monomers results in biomolecular complexes of proteins. However, in some pathological conditions, for example in neurodegenerative diseases, oligomerization, commonly caused by the misfolding of proteins, is considered to be a key pathological aspect.

The term "synucleinopathies" has been coined for pathological conditions wherein abnormal functioning of alpha-Syn, most likely caused by misfolding of the monomeric protein, and subsequent aggregation of alpha-Syn play a central role. Synucleinopathies include neurodegenerative diseases, such as Parkinson disease (PD), progressive supranuclear palsy (PSP), multiple system atrophy (MSA), corticobasal degeneration (CBD), vascular Parkinsonism (VaP), and other parkinsonian syndromes, Parkinson Disease Dementia, Frontotemporal Dementia, Dementia with Lewy Bodies and Traumatic Brain Injury.

Current treatment options for synucleinopathies are directed to managing the disease's symptoms, for example, but not limited to, restoring dopamine signaling.

In particular there is evidence that alpha-Syn oligomers consisting of a limited plurality of alpha-Syn monomers are of particular interest in the diagnosis and treatment of synucleinopathies. Several in vitro studies have confirmed the direct relationship between exposure to alpha-Syn oligomers and cell death (Bengoa-Vergniory et al. 2017 DOI 10.1007/s00401-017-1755-1).

Furthermore, post mortem studies have reported that the abundance of alpha-Syn fibrils in the form of Lewy bodies are not predictive for important clinical variables (Vaikath et al. 2019 DOI 10.1111/jnc.14713). As such, alpha-Syn fibrils may not be directly responsible for the clinical features of the disease, and thus relate poorly to the clinical outcome of synucleinopathies.

Various antibodies to alpha-Syn are commercially available, and are widely used in the characterization of alpha-Syn for scientific purposes, treatment purposes or diagnostic purposes. Examples of such antibodies are 5G4 and MJFR14. Moreover, there are antibodies to alpha-Syn that have been selected for further clinical development. Examples of such antibodies are the pharmaceutical composition as disclosed in WO2004/041067.

Some drawbacks are associated with known antibodies, such as 5G4 and MJFR14. 5G4 displays a low binding affinity for alpha-Syn oligomers. MJFR14 displays a lack of specificity for alpha-Syn oligomers, when compared to fibrillary and monomeric alpha-Syn.

In the art other antibodies are disclosed. For example, WO2014/132210A1 discloses the generation (including recombinant production) of alpha-Syn antibodies having high affinity to both alpha-Syn oligomers, protofibrils and fibrils with no or only minor binding to alpha-Syn monomers. WO2011/104696A1 discloses the generation of antibodies having high affinity to alpha-syn protofibrils. WO2010/069603A1 discloses the isolation and characterization of human monoclonal antibodies directed to alpha-synuclein from elderly subjects as well as recombinant production of these antibodies. Also WO2010/069603A1 discloses the antibody designated as NI-202.12F4 binds to both oligomeric and fibrillary forms of alpha-Syn with only minor binding to monomer. WO2019/023809A1 discloses the generation and characterization of antibody designated 2F11 which binds to alpha-Syn oligomer and alpha-Syn monomer. WO2012/177972A1 discloses the generation of anti-alpha-Syn antibody NI-202.21D11 which binds with high affinity to alpha-Syn in both oligomeric and aggregated form.

In the art, antigen-binding portions, for example antibody fragments such as single chain variable fragments, are disclosed. Emadi et al. J Mol Biol. 2007 May 11; 368(4): 1132-1144 describe the isolation of a scFv directed against the oligomeric form of alpha-Syn which appear to bind (proto)fibrils.

There is a continuous need for antibodies that do not, or to a lesser extent, display the limitations of current antibodies and antigen-binding portions thereof. In particular, there is a need for new alternative antibodies and/or antibody fragments, that display different binding profiles when compared to known antibodies, having an increase affinity towards alpha-Syn oligomers when compared to alpha-Syn monomers and fibrils.

It is an object of the present invention to overcome these problems, among others, by the antibodies, antigen-binding portions, nucleic acid sequences, compositions and uses as detailed in the appended claims.

SUMMARY OF THE INVENTION

The present invention relates to an isolated antibody, or antigen-binding portion thereof, wherein said antibody comprises, at least one of:
  a) a heavy chain CDR1 comprising the amino acid sequence of SEQ ID NO: 11;
  b) a heavy chain CDR2 comprising the amino acid sequence of SEQ ID NO: 12;
  c) a heavy chain CDR3 comprising the amino acid sequence of SEQ ID NO: 13;
  d) a light chain CDR1 comprising the amino acid sequence of SEQ ID NO: 14;
  e) a light chain CDR2 comprising the amino acid sequence of SEQ ID NO: 15; and
  f) a light chain CDR3 comprising the amino acid sequence of SEQ ID NO: 16.

In a further aspect the invention provides an isolated antibody, or antigen-binding portion thereof, wherein the antibody as taught herein comprises a heavy chain variable region encoded by the nucleic acid sequence as shown in SEQ ID NO: 1 and/or a light chain variable region encoded by the nucleic acid sequence as shown in SEQ ID NO: 2, preferably wherein said the amino acid sequence encoded by the nucleic acid sequence as shown in SEQ ID NO: 1 is the amino acid sequence as shown in SEQ ID NO: 3 and/or wherein the amino acid sequence encoded by the nucleic acid sequence as shown in SEQ ID NO: 2 is the amino acid sequence as shown in SEQ ID NO: 4.

In a further aspect the invention provides an isolated antibody, or antigen-binding portion thereof, wherein the antibody as taught herein comprises a heavy chain variable region represented by the amino acid sequence as shown in SEQ ID NO: 11, SEQ ID NO: 12 and SEQ ID NO: 13 and/or a light chain variable region represented by the amino acid sequence as shown in SEQ ID NO: 14, SEQ ID NO: 15 and SEQ ID NO: 16.

The present invention further provides an isolated antibody, or antigen-binding portion thereof, wherein said antibody comprises all of:
a) a heavy chain CDR1 comprising the amino acid sequence of SEQ ID NO: 11;
b) a heavy chain CDR2 comprising the amino acid sequence of SEQ ID NO: 12;
c) a heavy chain CDR3 comprising the amino acid sequence of SEQ ID NO: 13;
d) a light chain CDR1 comprising the amino acid sequence of SEQ ID NO: 14;
e) a light chain CDR2 comprising the amino acid sequence of SEQ ID NO: 15; and
f) a light chain CDR3 comprising the amino acid sequence of SEQ ID NO: 16.

In another aspect the invention provides in an isolated antibody, or antigen-binding portion thereof, as taught herein, wherein said antibody, or antigen-binding portion thereof, can bind an epitope of alpha-Syn oligomer.

In further aspect of the invention the antibody has an IgG isotype, preferably an IgG2a isotype, more preferably an IgG2a kappa isotype.

The invention further provides a nucleic acid comprising a polynucleotide sequence encoding the antibody, or antigen-binding portion thereof, as taught herein.

The invention also provides a polynucleotide sequence encoding the amino acid sequence of SEQ ID NO: 3, and/or a polynucleotide sequence encoding the amino acid sequence SEQ ID NO: 4.

In one aspect of the invention a nucleic acid is provided, wherein the nucleic acid comprises a polynucleotide encoding the antibody, or antigen-binding portion thereof, according to the invention, said nucleic acid comprising:
a) a nucleic acid sequence according to SEQ ID NO: 5;
b) a nucleic acid sequence according to SEQ ID NO: 6; and
c) a nucleic acid sequence according to SEQ ID NO: 7; and/or comprising:
d) a nucleic acid sequence according to SEQ ID NO: 8;
e) a nucleic acid sequence according to SEQ ID NO: 9; and
f) a nucleic acid sequence according to SEQ ID NO: 10.

In a further aspect, the nucleic acid according to the invention comprises the nucleic acid sequence according to SEQ ID NO: 1 and/or according to SEQ ID NO: 2.

In one embodiment of the invention an isolated antibody, or antigen-binding portion thereof, is provided, wherein the antibody binds alpha-Syn oligomers with a binding affinity of 150 pM or less, more preferably 100 pM or less, even more preferably 75 pM or less.

In a further aspect of the invention the isolated antibody, or antigen-binding portion thereof, as provided binds alpha-Syn oligomers with a binding affinity that lies within the range of 25 pM-150 pM.

In a further aspect of the invention an isolated antibody, or antigen-binding portion thereof, is provided, wherein the antibody has a higher binding preference for alpha-Syn oligomers compared to alpha-Syn fibrils and/or compared to alpha-Syn monomers, preferably wherein the ratio of the binding affinity for alpha-Syn oligomers:alpha-Syn fibrils is 20 or more, preferably 30 or more, more preferably 50 or more.

In a further aspect of the invention an isolated antibody, or antigen-binding portion thereof, as taught herein is provided, wherein the antibody binds alpha-Syn oligomers with a binding affinity of 200 pM or less, preferably 150 pM or less, and displays a ratio of the binding affinity for alpha-Syn oligomers:alpha-Syn fibrils that is 20 or more, preferably 30 or more, more preferably 50 or more.

In a further aspect of the invention an isolated antibody, or antigen-binding portion thereof, is provided that competes in binding to the same epitope as the antibody, or antigen-binding portion thereof, as taught herein, preferably wherein said epitope is an alpha-Syn epitope, more preferably wherein said epitope is an alpha-Syn oligomer epitope.

In a further aspect the invention provides an isolated antibody, or antigen-binding portion thereof, competing with binding to the same epitope as the antibody, or antigen-binding portion thereof, according to the invention, which binds alpha-Syn oligomers with a binding affinity of 150 pM or less, and displays a ratio of the binding affinity for alpha-Syn oligomers:alpha-Syn fibrils that is 20 or more, preferably 30 or more, more preferably 50 or more.

In one aspect the invention foresees in a competing isolated antibody, or antigen-binding portion thereof, wherein said antibody is the antibody, or antigen-binding portion, according to the invention.

In another aspect the invention provides a nucleic acid that comprises a polynucleotide encoding the antibody, or antigen-binding portion thereof, according to the invention.

In another aspect the invention provides an expression vector comprising:
a polynucleotide encoding the isolated antibody, or antigen-binding portion thereof, according to the invention, or
a nucleic acid according to the invention.

In a further aspect the invention provides a viral vector, wherein the expression vector comprises:
a polynucleotide encoding the isolated antibody, or antigen-binding portion thereof according to the invention; or
a nucleic acid according to the invention, preferably wherein the viral vector is a recombinant adeno-associated virus.

In a further aspect the invention provides a host cell comprising the nucleic acid, or the expression vector, or the viral vector according to the invention, preferably the host cell expresses an antibody, or antigen-binding portion thereof, according to the invention.

In a further aspect of the invention the host cell according to the invention is a bacterial cell or a mammalian cell.

In a further aspect the invention provides a process for producing an antibody, or antigen-binding portion thereof, wherein the process comprises cultivating the host cell according to the invention comprising a nucleic acid, an expression vector or a viral vector, comprising a nucleic acid encoding an antibody, or antigen-binding portion thereof, and obtaining the antibody, or antigen-binding portion thereof, encoded by said nucleic acid, expression vector or viral vector from the culture.

In a further aspect the invention provides a pharmaceutical composition that comprises the antibody, or antigen-binding portion thereof, or the nucleic acid, or the expression vector, or the viral vector, comprising a nucleic acid encoding an antibody, or antigen-binding portion thereof, according to the invention.

In a further aspect the invention provides the antibody, or antigen-binding portion thereof, or the nucleic acid, or the expression vector, or the viral vector, comprising a nucleic acid encoding an antibody, or antigen-binding portion thereof, according to the invention for use as a medicament.

In a further aspect the invention provides the antibody, or antigen-binding portion thereof, or the nucleic acid, or the expression vector, or the viral vector, comprising a nucleic acid encoding an antibody, or antigen-binding portion thereof, according to the invention for use in the treatment, prevention, slowing of progression, or alleviation of a neurodegenerative disease.

In a further aspect the antibody, or antigen-binding portion thereof, or the nucleic acid, or the expression vector, or the viral vector, comprising a nucleic acid encoding an antibody, or antigen-binding portion thereof, according to the invention for use in the treatment, prevention, slowing of progression, or alleviation of a neurodegenerative disease according to the invention is for use in the treatment, prevention, slowing of progression, or alleviation of a neurodegenerative disease wherein the neurodegenerative disease is selected from the group comprising Parkinson disease (PD), progressive supranuclear palsy (PSP), multiple system atrophy (MSA), corticobasal degeneration (CBD), vascular Parkinsonism (VaP), and other parkinsonian syndromes, Parkinson Disease Dementia, Frontotemporal Dementia, Dementia with Lewy Bodies and Traumatic Brain Injury.

In a further aspect the invention provides an in vitro or ex vivo method comprising binding the antibody, or antigen-binding portion thereof, according to the invention to an alpha-Syn oligomer.

In a further aspect the in vitro or ex vivo method according to the invention comprises Western blotting, immunohistochemistry, ELISA, immunocytochemistry, Flow cytometry, FACS, immunoprecipitation, Fluorescence Resonance Energy Transfer (FRET), amplified luminescent proximity homogeneous assay, bead-based assay technology, Surface Plasmon Resonance (SPR), bio-layer interferometry, or Enzyme Linked ImmunoSpot (ELISpot).

In a further aspect the invention provides a method for diagnosing a disease, preferably a neurodegenerative disease, comprising detecting and/or quantifying alpha-Syn and/or alpha-Syn oligomers using the antibody, or antigen-binding portion thereof, according to the invention in a sample obtained from a subject.

Definitions

For purposes of the present invention, the following terms are defined below.

As used herein, the singular form terms "A," "an," and "the" include plural referents unless the content clearly dictates otherwise. Thus, for example, reference to "a cell" includes a combination of two or more cells, and the like.

As used herein, the term "affinity" or "binding affinity" refers to the strength of binding of a single molecule of a substance to its ligand. As used herein, affinity is the affinity as determined by an ELISA experiment as described herein, although the skilled person is aware that the affinity may also be determined by other methods known to the person skilled in the art, such as ELISA and SPR. Affinity is defined by the concentration of the substance (i.e. the antibody, or antigen-binding portion thereof) wherein 50% of the substance is bound to its ligand in one particular experiment. The skilled person is aware that affinity or binding affinity may be expressed in grams (g), milligrams (mg), micrograms (ug), nanograms (ng), picograms (pg) per liter (L), per milliliter (mL), or per microliter (µL), or in millimolar (mM), micromolar (µM), nanomolar (nM) or picomolar (pM). As used herein binding affinity is preferably expressed in picomolar (pM). Typically, the smaller the concentration of the single molecule for inducing a biological response, for example activation and/or inhibition of a cellular signaling pathway, the greater the binding affinity of the ligand for its target. Thus, as used herein, the smaller the pM value, the greater the binding affinity of the antibody, or antigen binding portion thereof for its target.

As used herein, the term "and/or" refers to a situation wherein one or more of the stated cases may occur, alone or in combination with at least one of the stated cases, up to with all of the stated cases.

As used herein, the term "antibody", is intended to refer to immunoglobulin (Ig) molecules comprised of four polypeptide chains; two heavy chains and two light chains, inter-connected by disulfide bonds. Each heavy chain is comprised of a heavy chain variable region (abbreviated herein as HCVR or VH) and a heavy chain constant region, CH. The heavy chain constant region is comprised of three domains, CH1, CH2 and CH3. Each light chain is comprised of a light chain variable region (abbreviated herein as LCVR or VL) and a light chain constant region. The light chain constant region is comprised of one domain, CL. The VH and VL regions can be further subdivided into regions of hypervariability, termed complementarity determining regions (abbreviated herein as CDR), interspersed with regions that are more conserved, termed framework regions (FR). Each VH and VL is composed of three CDRs and four FRs, arranged from amino-terminus to C-terminus in the following order: FR1, CDR1, FR2, CDR2, FR3, CDR3, FR4. Light chains are classified as kappa or lambda. Heavy chains are classified as gamma, mu, alpha, delta, or epsilon, and define the antibody's isotype as IgG, IgM, IgA, IgD or IgE, respectively.

As used herein, the term "antigen" refers to a substance to which a binding portion of an antibody may bind. The specific immunoreactive sites within the antigen are known as "epitopes" (or antigenic determinants). A target for an antibody, or antigen-binding portion thereof, may comprise an antigen, such as is defined herein.

As used herein, the term "antigen-binding portion" or "antigen-binding fragment", used interchangeably, of an antibody (or simply "antibody portion") refers to one or more fragments of an antibody that retain the ability to (specifically) bind to an antigen (e.g. alpha-Syn). It has been shown that the antigen-binding function of an antibody can be performed by fragments of a full-length antibody. Non-limiting examples of binding fragments encompassed within the term "antigen-binding portion" of an antibody include (i) a Fab fragment, a monovalent fragment consisting of the VL, VH, CL and CH1 domains; (ii) a F(ab')2 fragment, a bivalent fragment comprising two Fab fragments linked by a disulfide bond at the hinge region; (iii) a Fd fragment consisting of the VH and CH1 domains; (iv) a scFv fragment consisting of the VL and VH domains of a single arm of an antibody, and may be connected with a linker; (v) a single domain fragment (dAb fragment) which consists of a VH domain, a VH-fragment, a VL domain, or a VL-fragment, (vi) an isolated complementarity determining region (CDR); and (vii) a tandem scFv fragment consisting of 2 (or more) scFv's connected, for example head-to-tail, with a linker. Suitable linkers are Gly-Gly-Gly-Gly-Ser, Gly-Gly-Gly-Gly-Ser-Gly-Gly-Gly-Gly-Ser or Gly-Gly-Gly-Gly-Ser-Gly-Gly-Gly-Gly-Ser-Gly-Gly-Gly-Gly-Ser linkers as defined in SEQ ID Nos 27-29 or variations thereof.

As used herein, the term "at least" a particular value means that particular value or more. For example, "at least 2" is understood to be the same as "2 or more" i.e., 2, 3, 4, 5, 6, 7, 8, 9, 10, 11, 12, 13, 14, 15, . . . , etc. As used herein, the term "at most" a particular value means that particular value or less. For example, "at most 5" is understood to be the same as "5 or less" i.e., 5, 4, 3, . . . −10, −11, etc.

As used herein, the term "binds" when referring to the interaction between the antibody taught herein and alpha-Syn oligomers, alpha-Syn fibrils, or alpha-Syn monomers, respectively, means that the interaction is dependent upon the presence of a particular structure (e.g., an epitope (or antigenic determinant)) on the respective antigen).

As used herein, the terms "binding preference", or "preferred binding", or "binds preferably" are terms well understood in the art and shall be taken to mean that a compound reacts or associates more frequently, more rapidly, with greater duration and/or with greater affinity with another compound. In the context of the antibody, or antigen-binding portion thereof, as taught herein, it shall be taken to mean that the antibody, or antigen-binding portion thereof, as taught herein, reacts or associates more frequently, more rapidly, with greater duration and/or with greater affinity with alpha-Syn oligomers than it does with an alternative target, including alpha-Syn fibrils and alpha-Syn monomers. Methods to determine such preferential (or specific) binding are also well known in the art, for example as described in the Examples herein. More particularly, the antibody as taught herein binds with greater affinity to alpha-Syn oligomers than it does to other targets, including alpha-Syn fibrils and alpha-Syn monomers. For example, an alpha-Syn oligomer-binding antibody, or antigen-binding portion thereof, as taught herein preferably binds to alpha-Syn oligomers with greater affinity (e.g. 10 fold, 20 fold, 30 fold, or 40 fold or 50 fold or 60 fold or 80 fold to 100 fold or 150 fold or 200 fold greater affinity), more readily, and/or with greater duration than it binds to other antigens, including alpha-Syn fibrils and alpha-Syn monomers.

As used herein, the word "comprise" or variations thereof such as "comprises" or "comprising" will be understood to include a stated element, integer or step, or group of elements, integers or steps, but not to exclude any other element, integer or steps, or groups of elements, integers or steps. The verb "comprising" includes the verbs "essentially consisting of" and "consisting of".

As used herein, the term "conventional techniques" refers to a situation wherein the methods of carrying out the conventional techniques used in methods of the invention will be evident to the skilled worker. The practice of conventional techniques in molecular biology, biochemistry, computational chemistry, cell culture, recombinant DNA, bioinformatics, genomics, sequencing and related fields are well-known to those of skill in the art and are discussed, for example, in the following literature references: Sambrook et al., Molecular Cloning. A Laboratory Manual, 2nd Edition, Cold Spring Harbor Laboratory Press, Cold Spring Harbor, N.Y., 1989; Ausubel et al., Current Protocols in Molecular Biology, John Wiley & Sons, New York, 1987 and periodic updates; and the series Methods in Enzymology, Academic Press, San Diego.

As used herein, the term "diagnose" refers to detecting or identifying in a subject or a sample a disorder, a disease or condition, or its absence. Diagnosing may further refer to distinguishing between related disorders, such as for example distinguishing between different synucleinopathies.

As used herein, the term "epitope" refers to a part of the antigen that interacts with the antibody, i.e. the immunoreactive site. The epitope may consist of a linear sequence of amino acids, i.e. amino acids that are, as part of a biological structure, in contact with one another in a continuous line, or a conformational sequence of amino acids, i.e. amino acids that are, as part of a biological structure, not in contact with one another, for example formed as a consequence of protein-folding, or another conformational change.

As used herein, the term "ex vivo" refers to experimentation or measurements done in or on tissue from an organism in an external environment with minimal alteration of natural conditions./pct As used herein, the term "fibril" refers to a structural biological material that comprises assemblies of non-covalently associated, individual peptides, i.e. linear polymeric biomolecules, that show fibrillary structure e.g. when detected by a microscope. The term "fibril" may be used interchangeably with the term "amyloid". Fibrils are generally assumed to be insoluble multimeric complexes of peptide chains that may be formed by multiple monomeric peptides. It is generally assumed that fibrillary amyloid structures, e.g. chains, are aligned and may be stabilized by steric zipper interactions, for example hydrogen bonding, steric packing, and/or specific hydrophobic side-chain contacts. The skilled person is aware that the term "fibril" refers to another species of folded protein than "oligomer". A skilled person is aware that fibrillary (amyloid) structures can be identified through Thioflavin T, a marker for presence of cross-beta sheet quaternary structures which are typical for fibrils. A fibrillary structure that should be associated with the term "fibril" as defined herein is one that can be determined as such by a person skilled in the art.

As used herein, the terms "host cell", "recombinant host cell", "transformed cell", and "transfected cell" refer to an individual cell (or organism) arising as a result of at least one nucleic acid, and that is able to express an antibody, or antigen-binding portion thereof according to the invention. The host cell may be selected from the group consisting of eukaryotic and prokaryotic cells. The host cell may contain a nucleic acid construct as an extra-chromosomally (episomal) replicating molecule. A host cell may also contain a vector, comprising one or more nucleic acids, that encodes a protein, or protein-like structure, comprising one or more amino acids.

As used herein, the term "identity" refers to a measure of the identity of nucleotide sequences or amino acid sequences. In general, the sequences are aligned so that the highest order match is obtained. "Identity" per se has an art-recognized meaning and can be calculated using published techniques. See, e.g.: (Computational Molecular Biology, Lesk, A. M., ED., Oxford University Press, New York, 1988; Biocomputing: Informatics And Genome Projects, Smith, D. W., ED., Academic Press, New York, 1993; Computer Analysis Of Sequence Data, Part I, Griffin, A. M., And Griffin, H. G., EDS., Humana Press, New Jersey, 1994; Sequence Analysis In Molecular Biology, Von Heinje, G., Academic Press, 1987; and Sequence Analysis Primer; Gribskov, M. and Devereux, J., eds., M Stockton Press, New York, 1991). While there exist a number of methods to measure identity between two nucleotide sequences or amino acid sequences, the term "identity" is well known to skilled artisans (Carillo, H., and Lipton, D., SIAM J. Applied Math (1988) 48:1073). Methods commonly employed to determine identity or similarity between two sequences include, but are not limited to, those disclosed in Guide To Huge Computers, Martin J. Bishop, ed., Academic Press, San Diego, 1994, and Carillo, H., and Lipton, D., Siam J. Applied Math (1988) 48:1073. Methods to determine identity and similarity are codified in computer programs. Preferred computer program methods to determine identity and similarity between two sequences include, but are not limited to, GCS program package (Devereux, J., et al., Nucleic Acids Research (1984) 12(1):387), BLASTP, BLASTN, FASTA (Atschul, S. F. et al., J. Molec. Biol. (1990) 215: 403).

As an illustration, by a polynucleotide having a nucleotide sequence having at least, for example, 95% "identity" to a reference nucleotide sequence encoding a polypeptide of a certain sequence, it is intended that the nucleotide sequence of the polynucleotide is identical to the reference sequence except that the polynucleotide sequence may include up to five point mutations per each 100 nucleotides of the reference amino acid sequence. In other words, to obtain a polynucleotide having a nucleotide sequence at least 95% identical to a reference nucleotide sequence, up to 5% of the nucleotides in the reference sequence may be deleted and/or substituted with another nucleotide, and/or a number of nucleotides up to 5% of the total nucleotides in the reference sequence may be inserted into the reference sequence. These mutations of the reference sequence may occur at the 5' or 3' terminal positions of the reference nucleotide sequence, or anywhere between those terminal positions, interspersed either individually among nucleotides in the reference sequence or in one or more contiguous groups within the reference sequence.

Similarly, by a polypeptide having an amino acid sequence having at least, for example, 95% "identity" to a reference amino acid sequence of SEQ ID NO: X is intended that the amino acid sequence of the polypeptide is identical to the reference sequence except that the amino acid sequence may include up to five amino acid alterations per each 100 amino acids of the reference amino acid of SEQ ID NO: X. In other words, to obtain a polypeptide having an amino acid sequence at least 95% identical to a reference amino acid sequence, up to 5% of the amino acid residues in the reference sequence may be deleted or substituted with another amino acid, or a number of amino acids up to 5% of the total amino acid residues in the reference sequence may be inserted into the reference sequence. These alterations of the reference sequence may occur at the amino or carboxy terminal positions of the reference amino acid sequence or anywhere between those terminal positions, interspersed either individually among residues in the reference sequence or in one or more contiguous groups within the reference sequence.

As used herein, the term "in vitro" refers to experimentation or measurements conducted using components of an organism that have been isolated from their natural conditions.

As used herein, an "isolated antibody" refers to an antibody that is isolated from its natural environment or that is produced by means of a technical process, even if the antibody previously occurred in nature.

As used herein, an "isolated nucleic acid" refers to a nucleic acid encoding an antibody, or antigen-binding portion thereof, (e.g., VH, VL, CDR) that is isolated from its natural environment or that is produced by means of a technical process, even if the nucleic acid previously occurred in nature.

As used herein, the term "monomer" refers to a single molecule such as a peptide. For example, the protein alpha-Syn can occur as single molecule, as a monomer, in a biological system. Further, as used herein, binding to a monomer does not mean binding to a monomer that is a part of an oligomer or fibril.

As used herein, the term "neurodegenerative disease" or "neurodegenerative disorder", used interchangeably, refers to specific diseases that are consequences of processes leading to the progressive loss of structure, i.e. degeneration, and/or function of neurons. Examples of such neurodegenerative diseases include, but are not limited to, Alzheimer's disease, synucleinopathies such as dementia with Lewy bodies or Parkinson' disease, and multiple system atrophy. Mechanisms that contribute to the occurrence of neurodegenerative diseases are known to a person skilled in the art.

As used herein, the term "nucleic acid", "nucleic acid molecule" and "polynucleotide" is intended to include DNA molecules and RNA molecules. A nucleic acid (molecule) may be single-stranded or double-stranded, but preferably is double-stranded DNA.

As used herein, the term "oligomer" refers to a complex of monomers, for example of the protein alpha-Syn. An oligomer can be a limited plurality of monomeric molecules and has not acquired a fibrillary conformation, as is for example described in Bengoa-Vergniory et al. 2017. The skilled person is aware that the term "oligomer" refers to another species of folded protein than "fibril". An oligomer generally consists of a limited plurality of monomeric molecules accumulated into a soluble macromolecular complex. An oligomer is generally regarded as a disordered collection of peptide chains held together loosely by hydrophobic interactions. Oligomeric structures, for example oligomeric structures of alpha-Syn, are highly conformationally diverse (e.g. some are primarily alpha-helical rich, some are beta-sheet rich, others are primarily disordered). The skilled person is aware that an oligomer, for example an alpha-Syn oligomer, tends to have a secondary structure, for example a small spherical morphology, which is distinct from the elongated fibrils. Under certain conditions known to the skilled person monomers, for example alpha-Syn monomers, undergo a conformational transformation in which the soluble monomers initially form soluble oligomers and then gradually assemble and eventually form into the insoluble fibrils. Therefore, (alpha-Syn) oligomers can be distinguished from (alpha-Syn) fibrils among others in that oligomers are generally soluble and fibrils are generally insoluble.

As used herein, the term "polynucleotide" refers to a covalently bonded chain of nucleotide monomers.

As used herein, the terms "sequence" when referring to nucleotides, or "nucleic acid sequence", "nucleotide sequence" or "polynucleotide sequence" refer to the order of nucleotides of, or within, a nucleic acid and/or polynucleotide. Within the context of the current invention a first nucleic acid sequence may be comprised within or overlap with a further nucleic acid sequence.

As used herein, the term "specificity" means the biochemical preference of a biological molecular structure, i.e. an antibody or a ligand, to form a biological, covalently or non-covalently bound complex with another, preferred, biological molecular structure, i.e. an on-target complex, over other, non-preferred, biological molecular structures, i.e.

off-target complexes. On-target specificity, as further referred to herein, implies that the biological molecular structure forms a preferred complex according to the invention. However, on-target specificity and off-target specificity often are both present in a biological system. Thus the term "specificity" does not automatically refer to a 0% or 100% situation, but may be within a range of 100%-0% to 0%-100% of the one situation (i.e. absolute on-target binding) for example being present in a biological system, or the other (i.e. absolute off-target binding).

As used herein, the term "subject" or "individual" or "animal" or "patient" or "mammal," used interchangeably, refer to any subject, particularly a mammalian subject, for whom diagnosis, prognosis, or therapy is desired. Mammalian subjects include humans, domestic animals, farm animals, and zoo-, sports-, or pet-animals such as dogs, cats, guinea pigs, rabbits, rats, mice, horses, cattle, cows, bears, and so on. As defined herein a subject may be alive or dead. Samples can be taken from a subject post-mortem, i.e. after death, and/or samples can be taken from a living subject.

As used herein, terms "treatment", "treating", "palliating", "alleviating" or "ameliorating", used interchangeably, refer to an approach for obtaining beneficial or desired results including, but not limited to, therapeutic benefit. By therapeutic benefit is meant eradication or amelioration or reduction (or delay) of progress of the underlying disease being treated. Also, a therapeutic benefit is achieved with the eradication or amelioration or reduction (or delay) of progress of one or more of the physiological symptoms associated with the underlying disease such that an improvement or slowing down or reduction of decline is observed in the patient, notwithstanding that the patient can still be afflicted with the underlying disease.

As used herein the term "vector" refers to a nucleic acid molecule capable of transporting another nucleic acid to which the nucleic acid molecule capable of transporting has been linked. One type of vector is a "plasmid", which refers to a circular double stranded DNA loop into which additional DNA segments may be ligated. The term "vector" may also refer to the viral particle (i.e. viral vector) which contains the nucleic acid of interest.

DETAILED DESCRIPTION OF THE INVENTION

The section headings as used herein are for organizational purposes only and are not to be construed as limiting the subject matter described.

A portion of this invention contains material that is subject to copyright protection (such as, but not limited to, diagrams, device photographs, or any other aspects of this submission for which copyright protection is or may be available in any jurisdiction). The copyright owner has no objection to the facsimile reproduction by anyone of the patent document or patent invention, as it appears in the Patent Office patent file or records, but otherwise reserves all copyright rights whatsoever.

Various terms relating to the methods, compositions, uses and other aspects of the present invention are used throughout the specification and claims. Such terms are to be given their ordinary meaning in the art to which the invention relates, unless otherwise indicated. Other specifically defined terms are to be construed in a manner consistent with the definition as provided herein. The preferred materials and methods are described herein, although any methods and materials similar or equivalent to those described herein can be used in the practice for testing of the present invention.

Unless otherwise defined, all technical and scientific terms used herein have the same meaning as commonly understood by a person of ordinary skill in the art.

Present invention relates to providing a particular antibody, or antigen-binding portion thereof, that due to its binding affinity to one specific target compared to other targets offers an advantage over the prior art. The inventors have found that current strategies in neurodegenerative diseases prove insufficiently effective in providing a solution to the highly toxic oligomeric alpha-synuclein in a specific group of neurodegenerative diseases, i.e. synucleinopathies. Present invention provides an antibody, or an antigen-binding portion thereof, that is able to bind to the highly toxic alpha-synuclein oligomer with a higher affinity than its affinity to bind to alpha-synuclein monomers and/or alpha-synuclein fibrils. In other words, the antibody, or antigen-binding portion thereof, found by the inventors has a higher binding preference to alpha-synuclein oligomers than to alpha-synuclein fibrils and/or alpha-synuclein monomers.

The higher binding affinity, improved binding specificity and higher binding preference to alpha-synuclein oligomers when compared to alpha-synuclein monomers and/or alpha-synuclein fibrils has distinct advantages over prior art, for example in experimental procedures, for diagnostic purposes or as novel treatment option, for instance, but not limited to, in the treatment, alleviation, slowing down of progression or preventing of an alpha-synuclein oligomer related neurodegenerative disease.

By means of present invention inventors aim to offer a novel therapeutic means and/or a novel diagnostic means and/or a novel method for determining levels of alpha-synuclein oligomers in a sample.

Alpha-Syn Antibodies

The present invention provides an isolated antibody, or antigen-binding portion thereof, wherein the variable region of said antibody comprises at least one of:
a) a heavy chain CDR1 comprising the amino acid sequence of SEQ ID NO: 11;
b) a heavy chain CDR2 comprising the amino acid sequence of SEQ ID NO: 12;
c) a heavy chain CDR3 comprising the amino acid sequence of SEQ ID NO: 13;
d) a light chain CDR1 comprising the amino acid sequence of SEQ ID NO: 14;
e) a light chain CDR2 comprising the amino acid sequence of SEQ ID NO: 15; and
f) a light chain CDR3 comprising the amino acid sequence of SEQ ID NO: 16.

As defined herein an isolated antibody can consist of constant regions and variable regions. Further, an antibody as defined herein comprises a heavy chain and a light chain. The skilled person is aware of the structure of an antibody. Further, the skilled person is aware of the presence, structure and function of heavy chains and light chains in an antibody. Heavy chains and light chains of an antibody can consist of constant regions and variable regions. Variable regions and constant regions, as defined herein, can be antigen-binding portions of the isolated antibody. These regions can be present on heavy chains and/or on light chains of an antibody. The variable region of an antibody can consist of a framework region (FR) and a complementarity determining region (CDR). The variable region of an antibody thus may comprise a heavy chain comprising one or more FRs and one or more CDRs. Further, a variable region of an antibody as defined herein may comprise a light chain comprising one or more FRs and one or more CDRs. A variable region of an antibody as described herein may comprise a heavy chain comprising one or more FRs and one or more CDRs and/or a light chain comprising one or more FRs and one or more CDRs. The antibody, or antigen-binding portion thereof, as described in present invention thus can comprise a heavy chain comprising one or more CDRs and/or a light chain comprising one or more CDRs.

CDRs and FRs, as defined herein, are arranged from amino-terminus to C-terminus in the following order: FR1, CDR1, FR2, CDR2, FR3, CDR3, FR4.

As provided, CDR1 of the heavy chain of said antibody comprises the amino acids of SEQ ID NO: 11 (SDYAWN), CDR2 of the heavy chain of said antibody comprises the amino acids of SEQ ID NO: 12 (YISYSGNTYYNPSLKS), CDR3 of the heavy chain of said antibody comprises the amino acids of SEQ ID NO: 13 (NYVR).

As provided, CDR1 of the light chain of said antibody comprises the amino acids of SEQ ID NO: 14 (KSSQSL-LYTNGKTYLN), CDR2 of the light chain of said antibody comprises the amino acids of SEQ ID NO: 15 (LVSKLDS) and CDR3 of the light chain of said antibody comprises the amino acids of SEQ ID NO: 16 (LQSSHFPHT).

The isolated antibody, or antigen-binding portion thereof, may comprise a variable region comprising a heavy chain CDR, comprising heavy chain CDR1, represented by the amino acid sequence of SEQ ID NO: 11, heavy chain CDR2, represented by the amino acid sequence of SEQ ID NO: 12, and/or heavy chain CDR3, represented by the amino acid sequence of SEQ ID NO: 13.

The isolated antibody, or antigen-binding portion thereof, may also comprise a variable region comprising a light chain CDR, comprising light chain CDR1, represented by the amino acid sequence of SEQ ID NO: 14, light chain CDR2, represented by the amino acid sequence of SEQ ID NO: 15, and/or light chain CDR3, represented by the amino acid sequence of SEQ ID NO: 16.

In one aspect of the invention there is provided for an isolated antibody, or antigen-binding portion thereof, said antibody, or antigen-binding portion thereof, comprising a heavy chain variable region comprising:
a) a heavy chain CDR1 comprising the amino acid sequence of SEQ ID NO: 11;
b) a heavy chain CDR2 comprising the amino acid sequence of SEQ ID NO: 12;
c) a heavy chain CDR3 comprising the amino acid sequence of SEQ ID NO: 13; and/or comprising a light chain variable region comprising:
d) a light chain CDR1 comprising the amino acid sequence of SEQ ID NO: 14;
e) a light chain CDR2 comprising the amino acid sequence of SEQ ID NO: 15; and
f) a light chain CDR3 comprising the amino acid sequence of SEQ ID NO: 16.

The present invention provides an isolated antibody, or antigen-binding portion thereof, wherein the variable region of said antibody comprises all of the following CDRs:
a) a heavy chain CDR1 comprising the amino acid sequence of SEQ ID NO: 11;
b) a heavy chain CDR2 comprising the amino acid sequence of SEQ ID NO: 12;
c) a heavy chain CDR3 comprising the amino acid sequence of SEQ ID NO: 13;
d) a light chain CDR1 comprising the amino acid sequence of SEQ ID NO: 14;
e) a light chain CDR2 comprising the amino acid sequence of SEQ ID NO: 15; and
f) a light chain CDR3 comprising the amino acid sequence of SEQ ID NO: 16.

In one aspect the isolated antibody, or antigen-binding portion thereof, comprises a heavy chain variable region encoded by the nucleic acid sequence as shown in SEQ ID NO: 1, and a light chain variable region encoded by the nucleic acid sequence as shown in SEQ ID NO: 2.

The isolated antibody, or antigen-binding portion thereof, can also comprise a heavy chain variable region encoded by the nucleic acid sequence as shown in SEQ ID NO: 1. SEQ ID NO: 1 describes the nucleic acid sequence encoding the heavy chain FR1, CDR1, FR2, CDR2, FR3, CDR3 and FR4 regions. The amino acid sequence encoded by SEQ ID NO: 1 is depicted by SEQ ID NO: 3 and consists of the FR1, CDR1, FR2, CDR2, FR3, CDR3 and FR4 amino acid sequences of the heavy chain.

In another aspect the isolated antibody, or antigen-binding portion thereof, can comprise a light chain variable region encoded by the nucleic acid as shown in SEQ ID NO: 2. SEQ ID NO: 2 describes the nucleic acid sequence encoding the light chain FR1, CDR1, FR2, CDR2, FR3, CDR3 and FR4 regions. The amino acid sequence encoded by SEQ ID NO: 2 is depicted by SEQ ID NO: 4 and consists of the FR1, CDR1, FR2, CDR2, FR3, CDR3 and FR4 amino acid sequences of the light chain.

It was found by the inventors that an antibody having CDRs defined by SEQ ID Nos 11-16, or having variable regions encoded by the nucleic acid sequence represented by SEQ ID Nos 1 and 2, has distinct advantages over the prior art.

Hence the antibody of the invention as taught herein provides an advantage over other isolated antibodies, or antigen-binding portions thereof, directed to alpha-Syn. The antibody, or antigen-binding portion thereof, according to the invention is capable of binding alpha-Syn oligomers with a higher affinity and higher specificity than that it binds alpha-Syn monomers and/or alpha-Syn fibrils. Further, the antibody, or antigen-binding portion thereof, as disclosed is capable of binding off-target in a lower affinity and lower specificity.

For example, in Example 3 and FIG. 2A it is demonstrated that the antibody comprising CDRs according to SEQ ID NOs 11-16 binds strongly to alpha-Syn oligomers. FIG. 2A further demonstrates that the antibody comprising CDRs according to SEQ ID NOs 11-16 shows a higher binding affinity to alpha-Syn oligomers compared to alpha-Syn fibrils and/or alpha-Syn monomers. An antibody with improved affinity for alpha-Syn oligomers and/or an improved binding to alpha-Syn oligomers compared to alpha-Syn fibrils or alpha-Syn monomers are desirable, because alpha-Syn oligomers hold more relevance than alpha-Syn fibrils in synucleinopathies. Therefore such an antibody is a useful tool in in vitro or ex vivo studies, as diagnostic tools or as therapeutic agents. For example, the above demonstrates that antibody 26F1 (i.e. an antibody with CDRs represented by SEQ ID Nos 11-16) has binding affinities in the range of 25 to 150 pM while reference antibody 5G4 is likely to display a binding affinity to alpha-Syn oligomers that is a 2-fold, 3-fold, 4-fold, or even more than 4-fold weaker, than 26F1. Further it demonstrates that the binding affinity ratio of 26F1 is at least twenty fold higher, at least thirty fold (or much) higher, at least fifty fold (or much) higher, while reference antibody MJFR14 appears to bind oligomers and fibrils with a binding affinity that is similar for both forms of alpha-Syn (thus has a binding affinity ratio of about 1) (see FIG. 3). The antibody 26F1 is furthermore particularly preferred as it has alpha-Syn oligomer affinity in the sub 150 pM range and has a binding affinity ratio of alpha-Syn oligomers compared to alpha-Syn fibrils of at least twenty or higher, preferably thirty or higher, more preferably fifty or higher, therewith displaying better binding of the antibody, or antigen-binding portion thereof, towards oligomers compared to fibrils.

In particular the antibody according to the invention displays a higher binding preference for alpha-Syn oligomers compared to alpha-Syn fibrils and/or alpha-Syn monomers. Binding preference as described herein relates to a higher binding affinity of said antibody with alpha-Syn oligomers compared to binding affinity of said antibody to alpha-Syn fibrils and/or alpha-Syn monomers.

Thus, the alpha-Syn binding antibody as taught herein provides advantages over other alpha-Syn antibodies as known in the art.

In a further aspect the antigen-binding portion of the isolated antibody comprises one or more amino acid sequences, for example 1, 2, 3, 4, 5, or 6, selected from the group consisting of:
a) the amino acid sequence of SEQ ID NO: 11;
b) the amino acid sequence of SEQ ID NO: 12;
c) the amino acid sequence of SEQ ID NO: 13;
d) the amino acid sequence of SEQ ID NO: 14;
e) the amino acid sequence of SEQ ID NO: 15;
f) the amino acid sequence of SEQ ID NO: 16.

For example, if the antigen-binding portion of the isolated antibody comprises two sequences selected from the group it may comprise SEQ ID Nos 11 and 12, SEQ ID Nos 12 and 13, SEQ ID Nos 14 and 15 or SEQ ID Nos 15 and 16, but may also comprise SEQ ID Nos 11 and 14, SEQ ID Nos 12 and 15, or SEQ ID Nos 13 and 16, and the like. For example, if the antigen-binding portion of the isolated antibody comprises three sequences selected from the group it may comprise SEQ ID Nos 11, 12 and 13 or SEQ ID Nos 14, 15 and 16. For example, if the antigen-binding portion of the isolated antibody comprises four sequences selected from the group it may comprise SEQ ID Nos 11, 12, 13 and 14 or SEQ ID Nos 13, 14, 15 and 16. For example, if the antigen-binding portion of the isolated antibody comprises five sequences selected from the group it may comprise SEQ ID Nos 11-15 or SEQ ID Nos 12-16. For example, if the antigen-binding portion of the isolated antibody comprises six sequences selected from the group it may comprise SEQ ID Nos 11-16. Other SEQ ID Nos combinations than the SEQ ID Nos combinations exemplified herein are possible.

The binding of an antigen to its epitope is generally defined by its CDRs, therefore it is further envisioned as part of the invention the antigen-binding portion of the isolated antibody as described herein comprises at least one of the CDRs of said antibody. The skilled person is aware that the antigen-binding portion, as defined herein, of an isolated antibody generally retains its binding characteristics, while having the advantage of a much more reduced size of the binding molecule. Often, reduced size of a binding molecule correlates to a reduced weight of the binding molecule when compared to a full antibody. Such reduced size and reduced weight of the binding molecule results in some advantages over full antibodies. For example an advantage of an antigen-binding portion of the isolated antibody having a lower molecular weight and a reduced size when compared to an antibody, for example an IgG, is that it may diffuse more easily to a desired location, making it a more useful tool in ex vivo or in vitro studies, as a diagnostic tool or as a therapeutic agent; while retaining the beneficial binding characteristics of the full size antibody (e.g. IgG).

In one aspect, an isolated antibody, or antigen-binding portion of an isolated antibody, comprises at least one copy of at least one amino acid of the linear amino acid sequence of SEQ ID NO: 11, representing the CDR1 of the heavy chain of the isolated antibody, or antigen-binding portion thereof, that may be encoded by the nucleic acid sequence represented by SEQ ID NO: 5. In a further aspect, an isolated antibody, or antigen-binding portion of an isolated antibody, comprises at least one copy of at least one amino acid of the amino acid sequence of SEQ ID NO: 12, representing the CDR2 of the heavy chain of the isolated antibody, or antigen-binding portion thereof, that may be encoded by the nucleic acid sequence represented by SEQ ID NO: 6. In a further aspect, an isolated antibody, or antigen-binding portion of an isolated antibody, comprises at least one copy of at least one amino acid of the amino acid sequence of SEQ ID NO: 13, representing the CDR3 of the heavy chain of the isolated antibody, or antigen-binding portion thereof, that may be encoded by the nucleic acid sequence represented by SEQ ID NO: 7. In a further aspect, an isolated antibody, or antigen-binding portion of an isolated antibody, comprises at least one copy of at least one amino acid of the amino acid sequence of SEQ ID NO: 14, representing the CDR1 of the light chain of the isolated antibody, or antigen-binding portion thereof, that may be encoded by the nucleic acid sequence represented by SEQ ID NO: 8. In a further aspect, an isolated antibody, or antigen-binding portion of an isolated antibody, comprises at least one copy of at least one amino acid of the amino acid sequence of SEQ ID NO: 15, representing the CDR2 of the light chain of the isolated antibody, or antigen-binding portion thereof, that may be encoded by the nucleic acid sequence represented by SEQ ID NO: 9. In a further aspect, an isolated antibody, or antigen-binding portion of an isolated antibody, comprises at least one copy of at least one amino acid of the amino acid sequence of SEQ ID NO: 16, representing the CDR3 of the light chain of the isolated antibody, or antigen-binding portion thereof, that may be encoded by the nucleic acid sequence represented by SEQ ID NO: 10.

In a further aspect the invention relates to an isolated antibody, or antigen-binding portion thereof, which binds alpha-Syn oligomers with a binding affinity of 200 pM or less, preferably 150 pM or less, more preferably 100 pM or less, even more preferably 75 pM or less. For example the isolated antibody, or antigen-binding portion thereof, binds alpha-Syn oligomers with a binding affinity of 200 pM, 190 pM, 180 pM, 170 pM, 160 pM, 150 pM, 140 pM, 130 pM, 125 pM, 120 pM, 115 pM, 110 pM, 105 pM, 100 pM, 95 pM, 90 pM, 85 pM, 80 pM or 75 pM or less.

In a further aspect the invention relates to an isolated antibody, or antigen-binding portion thereof, which binds alpha-Syn oligomers with a binding affinity of 5 pM or more, preferably 15 pM or more, more preferably 20 pM or more, even more preferably 25 pM or more. For example the isolated antibody, or antigen-binding portion thereof, binds alpha-Syn oligomers with a binding affinity of 5 pM, 10 pM, 15 pM, 20 pM, 21 pM, 22 pM, 23 pM, 24 pM or 25 pM or more.

The binding affinity of the antibody, or antigen-binding portion, as described herein to alpha-Syn oligomers may be 150 pM or less, more preferably 100 pM or less, even more preferably 75 pM or less and 5 pM or more, preferably 15 pM or more, more preferably 20 pM or more, even more preferably 25 pM or more. The binding affinity of the antibody, or antigen-binding portion, as described herein to alpha-Syn oligomers preferably is somewhere within the range of 25 pM to 150 pM, for example 35 pM, 50 pM, 75 pM, 100 pM, 125 pM, 140 pM.

In an aspect for the invention there is provided for an isolated antibody, or antigen-binding portion thereof, wherein the antibody binds alpha-Syn oligomers with a binding affinity of 150 pM or less, more preferably 100 pM or less, even more preferably 75 pM or less, wherein the antibody has a higher binding preference for an alpha-Syn oligomers compared to alpha-Syn fibrils and compared to alpha-Syn monomers, and wherein the ratio of the binding affinity for alpha-Syn oligomers:alpha-Syn fibrils is 20 or more, preferably 30 or more.

In a further aspect of the invention an antibody, or antigen-binding portion thereof is provided that binds alpha-Syn oligomers with a binding affinity of 200 pM or less, preferably 150 pM or less and wherein the ratio of binding affinity for alpha-Syn oligomers:alpha-Syn fibrils is 20 or more, preferably 30 or more, more preferably 50 or more. For example the isolated antibody, or antigen-binding portion thereof binds alpha-Syn oligomers with a binding affinity of 200 pM, 190 pM, 180 pM, 170 pM, 160 pM, 150 pM, 140 pM, 130 pM, 125 pM, 120 pM, 115 pM, 110 pM, 105 pM, 100 pM, 95 pM, 90 pM, 85 pM, 80 pM or 75 pM or less. For example the ratio is 20, 30, 50 or more.

When referring to "ratio" it is contemplated that "ratio" of the binding affinity for one target of the antibody, or antigen-binding portion thereof, according to the invention, when compared to another target of the antibody, or antigen-binding portion thereof, according to the invention, is derived from the comparison of the EC50 values (either in ng/ml, pM or any other value for the affinity as defined herein) to both targets. In other words, the "ratio" comprises the ratio of EC50 values towards different antigens (e.g. $1/(10\hat{}\log EC50_{oligomer}/10\hat{}\log EC50_{monomer})$. For example an EC50 value of one antibody to one antigen, i.e. the first antigen of 100 pM and of the same antibody to a different antigen, i.e. the second antigen, of 20 pM means that said antibody binds with a relatively lower EC50 value to the second antigen than to the first antigen. A skilled person is well aware that a lower EC50 value constitutes a better binding of the antibody to the antigen. In other words, a lower EC50 value corresponds to higher binding affinity. In this non-limiting example the antibody displays a higher binding affinity towards the second antigen than towards to first antigen. Alternatively the skilled person is aware that Kd values may be utilized.

Half maximal effective concentration (EC50) refers to the concentration of a drug, antibody or toxicant which induces a response halfway between the baseline and maximum after a specified exposure time. Therefore when referring to an antibody the EC50 refers to the concentration of antibody eliciting a maximum response, for example an ELISA signal. A dissociation constant (Kd) is a specific type of equilibrium constant that measures the propensity of a larger object to separate (dissociate) reversibly into smaller components, as when a complex falls apart into its component molecules, or when a salt splits up into its component ions. In the specific case of antibodies binding to antigen, usually the term affinity constant refers to the association constant.

A non-limiting and hypothetical example to determine the ratio of binding affinities of the antibody, or antigen-binding portion, as described herein, to alpha-Syn oligomers compared to alpha-Syn monomers and/or alpha-Syn fibrils is provided herein. For example, the antibody, or antigen-binding portion thereof, as described herein binds an alpha-Syn monomer with a hypothetical binding affinity (EC50 value) of 100 pM, and binds to an alpha-Syn oligomer with a hypothetical binding affinity (EC50 value) of 50 pM. The ratio of the binding affinity is subsequently determined by comparing the binding affinity of said antibody, or antigen-binding portion thereof, to alpha-Syn monomer with the binding affinity of said antibody, or antigen-binding portion thereof, to alpha-Syn oligomer. This may be done for example per the following formula: $1/(10\hat{}\log EC50_{oligomer}/10\hat{}\log EC50_{monomer}$. Said formula provides the ratio of binding affinities of the antibody relative to one another. As provided herein the example, the ratio would be $(1/(10\hat{}\log 50 pM: 10\hat{}\log 100 pM))$, resulting a ratio of binding affinity alpha-Syn oligomer compared to alpha-Syn monomer of 2. A skilled person will understand that such ratio implicates an improved binding of the antibody to oligomers as compared to monomers.

The binding affinity and specificity of the antibody, or antigen-binding portion, according to the invention are preferably determined using an enzyme linked immunosorbent assay (ELISA). More preferably the EC50 values and ratios of binding affinities as disclosed herein are estimated per the method disclosed in Example 3 of this specification. Present invention further provides said isolated antibody comprising a constant region, comprising a constant region heavy chain and a constant region light chain, that consists of an IgG isotype. An IgG isotype in present invention preferably comprises an IgG2a isotype, more preferably an IgG2a kappa isotype.

The present invention further contemplates an isolated antibody, or antigen-binding portion thereof, wherein said antibody competes in binding to the same epitope as an antibody with CDRs corresponding to SEQ ID Nos 11-16, wherein said epitope of said competing antibody is an alpha-Syn epitope, more preferably wherein said epitope is an alpha-Syn oligomer epitope.

When referring to "competing" it is contemplated that the "competing" antibody, or antigen-binding portion thereof, displays similar binding characteristics with the isolated antibody, or antigen-binding portion thereof, as taught herein. In other words, a competing antibody displays competitive binding with the isolated antibody, or antigen-binding portion, as taught herein. For example, the competing antibody may bind the same epitope as the isolated antibody, or antigen-binding portion, as taught herein, and/or may bind an overlapping epitope, thereby competing directly with the isolated antibody, or antigen-binding portion, as taught herein. Said competing antibody, or antigen-binding portion thereof, binds an epitope of alpha-Syn. Preferably, the competing antibody, or antigen-binding portion thereof, displays a binding affinity for (epitopes of) alpha-Syn oligomers, and/or (epitopes of) alpha-Syn fibrils, and/or (epitopes of) alpha-Syn monomers. Particularly, the competing antibody, or antigen-binding portion thereof, is able to bind alpha-Syn oligomers, preferably with a binding affinity of 200 pM or less, 150 pM or less. Further, said competing antibody binds alpha-Syn oligomers at least 20-fold 30-fold, 50-fold stronger as compared to alpha-Syn fibrils. Preferably a competing antibody as referred herein is capable to displace an antibody with CDRs as defined with SEQ ID Nos 11-16 from an alpha-Syn epitope, preferably an alpha-Syn oligomer epitope, or vice versa, the competing antibody can be displaced from an alpha-Syn epitope, preferably an alpha-Syn oligomer epitope by an antibody with CDRs as defined with SEQ ID Nos 11-16. More preferably the competing antibody binds to the same epitope.

The competing antibody, or antigen-binding portion thereof, structurally can overlap with the isolated antibody, or antigen-binding portion thereof, as taught in present invention. For example said competing antibody, or antigen-binding portion thereof, can comprise at least 50%, at least 55%, at least 60%, at least 65%, at least 70%, at least 80%, at least 85%, at least 90%, at least 95%, 96%, 97%, 98%, 99%, 100% amino acid sequence identity to SEQ ID NO: 11 and/or SEQ ID NO: 12 and/or SEQ ID NO: 13 and/or SEQ ID NO: 14 and/or SEQ ID NO: 15 and/or SEQ ID NO: 16.

It is contemplated that the competing antibody, or antigen-binding portion thereof, can further display identical heavy chain CDRs and light chain CDRs to the isolated antibody, or antigen-binding portion thereof. For example, said antibody comprises:
a) a heavy chain CDR1 comprising the amino acid sequence of SEQ ID NO: 11;
b) a heavy chain CDR2 comprising the amino acid sequence of SEQ ID NO: 12;
c) a heavy chain CDR3 comprising the amino acid sequence of SEQ ID NO: 13;
d) a light chain CDR1 comprising the amino acid sequence of SEQ ID NO: 14;
e) a light chain CDR2 comprising the amino acid sequence of SEQ ID NO: 15; and
f) a light chain CDR3 comprising the amino acid sequence of SEQ ID NO: 16.

Present invention contemplates that an at least 50%, at least 55%, at least 60%, at least 65%, at least 70%, at least 80%, at least 85%, at least 90%, at least 95%, 96%, 97%, 98%, 99%, 100% identical structure can be formed by changes in the nucleic acid sequences and/or in the amino acid sequences. Such changes in the nucleic acid sequences and/or in the amino acid sequences, either occurring naturally or experimentally, are known to the person skilled in the art. Changes in the nucleic acid sequences and/or in the amino acid sequences may occur by for example, but not limited to, mutations (i.e. deletion, insertion or substitution), single nucleotide polymorphism, or experimentally per conventional techniques such as, but not limited to, CRISPR-Cas9 genome editing, CasX genome editing, splicing and vector-induced integration. Changes in the nucleic acid sequences and/or in the amino acid sequences and how said changes may occur or may be introduced are known to the skilled person or are described in widely used handbooks such as The Nucleic Acid Protocols Handbook edited by Ralph Rapley, Volume 2000 and/or The Protein Protocols Handbook, edited by John M. Walker, Volume 1996 and/or Ausubel F M (1987) Current Protocols in Molecular Biology. New York. N.Y., John Wiley & Sons.

It is further contemplated that said competing antibody, or antigen-binding portion thereof, can comprise a heavy chain variable region encoded by the polynucleotide sequence as shown in SEQ ID NO: 1, or at least 50%, at least 55%, at least 60%, at least 65%, at least 70%, at least 80%, at least 85%, at least 90%, at least 95%, 96%, 97%, 98%, 99%, 100% sequence identity thereof, and/or a light chain variable region encoded by the polynucleotide sequence as shown in SEQ ID NO: 2, or at least 50%, at least 55%, at least 60%, at least 65%, at least 70%, at least 80%, at least 85%, at least 90%, at least 95%, 96%, 97%, 98%, 99%, 100% sequence identity thereof.

In one aspect of the invention said competing antibody, or antigen-binding portion thereof, comprises one or more amino acid sequences selected from the group consisting of:
a) the amino acid sequence of SEQ ID NO: 11;
b) the amino acid sequence of SEQ ID NO: 12;
c) the amino acid sequence of SEQ ID NO: 13;
d) the amino acid sequence of SEQ ID NO: 14;
e) the amino acid sequence of SEQ ID NO: 15;
f) the amino acid sequence of SEQ ID NO: 16.

In an aspect of the invention the antigen-binding portion of an antibody comprises or consists of either the variable domain of the heavy chain and/or the variable domain of the light chain, thus having CDR1, CDR2 and CDR3 of the heavy chain variable region and/or CDR1, CDR2 and CDR3 of the light chain variable region. Therefore, in a further aspect said antigen-binding portion of a competing antibody, as taught herein, comprises:
a) the amino acid sequence of SEQ ID NO: 11;
b) the amino acid sequence of SEQ ID NO: 12; and
c) the amino acid sequence of SEQ ID NO: 13;
and/or comprises:
d) the amino acid sequence of SEQ ID NO: 14;
e) the amino acid sequence of SEQ ID NO: 15; and
f) the amino acid sequence of SEQ ID NO: 16.

In another aspect of the invention said antigen-binding portion of a competing antibody shows at least 50%, at least 55%, at least 60%, at least 65%, at least 70%, at least 80%, at least 85%, at least 90%, at least 95%, 96%, 97%, 98%, 99%, 100% sequence identity to:
a) the amino acid sequence of SEQ ID NO: 11;
b) the amino acid sequence of SEQ ID NO: 12; and
c) the amino acid sequence of SEQ ID NO: 13;
and/or at least 50%, at least 55%, at least 60%, at least 65%, at least 70%, at least 80%, at least 85%, at least 90%, at least 95%, 96%, 97%, 98%, 99%, 100% sequence identity to:
d) the amino acid sequence of SEQ ID NO: 14;
e) the amino acid sequence of SEQ ID NO: 15; and
f) the amino acid sequence of SEQ ID NO: 16.

Present invention further provides said competing antibody comprising a constant region, comprising a constant region heavy chain and a constant region light chain, said competing antibody comprises a IgG isotype preferably said competing antibody comprises an IgG2a isotype, more preferably an IgG2a kappa isotype.

In an aspect, the antibody taught herein is preceded by a signal peptide (sometimes referred to as signal sequence, targeting signal, localization signal, localization sequence, transit peptide, leader sequence or leader peptide) to achieve e.g. secretion of the antibody. In one aspect of the invention, the signal peptide for the heavy chain may comprise or consist of the amino acid sequence shown in SEQ ID NO: 19 encoded by nucleic acid sequence shown in the SEQ ID NO: 17. In another aspect, the signal peptide for the light chain may comprise or consist of the amino acid sequence shown in SEQ ID NO: 20 encoded by nucleic acid sequence shown in the SEQ ID NO: 18. The skilled person is aware that any signal peptide known in the art may be selected, and that the signal peptides used in present invention are not limited to the ones described by the amino acid sequences in SEQ ID NO: 19 and SEQ ID NO: 20, nor to the ones encoded by the nucleic acid sequences described by SEQ ID NO: 17 and SEQ ID NO: 18.

In an aspect the antibody according to the invention is an IgG comprising an amino acid sequence as defined in SEQ ID NO: 19 and/or SEQ ID NO: 20, or a sequence with 95%, 96%, 97%, 98% or 99% homology to SEQ ID NO: 19 and/or SEQ ID NO: 20, wherein the sequence comprises the CDRs as defined in SEQ ID Nos 11-16 wherein up to one amino acid may be changed per CDR, preferably up to one amino acid is changed for each of the heavy chain CDRs and light chain CDRs. Alternatively the IgG comprises an amino acid sequence as defined in SEQ ID NO: 30 and/or SEQ ID NO: 31, or a sequence with 95%, 96%, 97%, 98% or 99% homology to SEQ ID NO: 30 and/or SEQ ID NO: 31, wherein the sequence comprises the CDRs as defined in SEQ ID Nos 11-16 wherein up to one amino acid may be changed per CDR, preferably up to one amino acid is changed for each of the heavy chain CDRs and light chain CDRs.

In an aspect the antigen binding portion of the antibody according to the invention is an ScFv comprising an amino acid sequence as defined in SEQ ID NO: 3 and/or SEQ ID NO: 4, or a sequence with 95%, 96%, 97%, 98% or 99% homology to SEQ ID NO: 3 and/or SEQ ID NO: 4, wherein the sequence comprises the CDRs as defined in SEQ ID Nos 11-16 wherein up to one amino acid may be changed per CDR, preferably up to one amino acid is changed for each of the heavy chain CDRs and light chain CDRs. Alternatively the ScFv comprises an amino acid sequence as defined in SEQ ID NO: 25, or a sequence with 95%, 96%, 97%, 98% or 99% homology to SEQ ID NO: 25, wherein the sequence comprises the CDRs as defined in SEQ ID Nos 11-16 wherein up to one amino acid may be changed per CDR, preferably up to one amino acid is changed for each of the heavy chain CDRs and light chain CDRs.

In an aspect the antigen binding portion of the antibody according to the invention is an TaFv and comprises two ScFv binding portions as defined herein linked by a linker sequence. Alternatively, the TaFv comprises a, preferably two, amino acid sequences as defined in SEQ ID NO: 3 and/or SEQ ID NO: 4, or a, preferably two, sequences with 95%, 96%, 97%, 98% or 99% homology to SEQ ID NO: 3 and/or SEQ ID NO: 4, wherein the sequence comprises the CDRs as defined in SEQ ID Nos 11-16 wherein up to one amino acid may be changed per CDR, preferably up to one amino acid may be changed for each of the heavy chain CDRs and light chain CDRs. Alternatively the TaFv comprises an amino acid sequence as defined in SEQ ID NO: 26, or a sequence with 95%, 96%, 97%, 98% or 99% homology to SEQ ID NO: 26, wherein the sequence comprises the CDRs as defined in SEQ ID Nos 11-16 wherein up to one amino acid may be changed per CDR, preferably up to one amino acid may be changed for each of the heavy chain CDRs and light chain CDRs. The linker sequence may be a linker as defined in any one of SEQ ID Nos. 27 to 29.

In an aspect the antigen binding portion of the antibody according to the invention is an VH comprising an amino acid sequence as defined in SEQ ID NO: 3, or a sequence with 95%, 96%, 97%, 98% or 99% homology to SEQ ID NO: 3, wherein the sequence comprises the CDRs as defined in SEQ ID Nos 11-13 wherein up to one amino acid may be changed per CDR, preferably up to one amino acid may be changed for the heavy chain CDRs.

When used herein, a "changed amino acid" when referring to a sequence refers to the substitution, deletion or insertion of a single amino acid. Preferably the amino acid change is a conservative substitution of a single amino acid.

The present disclosure contemplates variant forms of binding protein of the disclosure. For example, such a variant binding protein comprises one or more conservative amino acid substitutions compared to a sequence set forth herein. In some examples, the binding protein comprises 10 or fewer, e.g., 9 or 8 or 7 or 6 or 5 or 4 or 3 or 2 or 1 conservative amino acid substitutions. A "conservative amino acid substitution" is one in which the amino acid residue is replaced with an amino acid residue having a similar side chain and/or hydropathicity and/or hydrophilicity.

The antibodies or antigen-binding fragments thereof as defined herein may have a tag, for example a C-terminal 6His tag, preferably a tag as defined in SEQ ID NO: 32. The antibodies or antigen binding fragments thereof may further be conjugated to a protein domain, a signal peptide, a label such as for example a radioactive isotope, or a pharmaceutical compound such as for example a chemotherapeutical compound. For example a protein domain can by incorporated in the antibody or antigen binding fragment to enhance passage of the blood brain barrier.

The invention further relates to an isolated epitope of alpha-Syn, preferably of alpha-Syn oligomer comprising a binding-site for the antibody, or antigen-binding portion thereof, according to present invention.

Nucleic Acids, Expression Vectors, and Host Cells

In an aspect the invention provides a polynucleotide sequence encoding the isolated antibody, or antigen-binding portion thereof, as taught herein. Particularly, a polynucleotide sequence as presently disclosed encodes the amino acid sequence of SEQ ID NO: 3, and/or encodes the amino acid sequence of SEQ ID NO: 4. As taught herein, the nucleic acid as disclosed herein can comprise the nucleic acid sequence of SEQ ID NO: 1 and/or the nucleic acid sequence of SEQ ID NO: 2. SEQ ID NO: 3 comprises the heavy chain CDRs represented by SEQ ID NOs 11-13 and the heavy chain FRs, and SEQ ID NO: 4 comprises the light chain CDRs represented by SEQ ID NOs 14-16 and the light chain FRs A polynucleotide encoding the antibody, or antigen-binding portion thereof, can be prepared synthetically or recombinantly, or by means of cloning. The polynucleotide can be prepared and assembled to a coding sequence by standard methods known to the person skilled in the art, for example by joining oligonucleotides containing preferred codons, i.e. encoding preferred amino acids, to obtain a polynucleotide of interest. Such polynucleotide can be introduced in a host cell, and consequently may be brought to expression, therewith obtaining an amino acid sequence of interest. In the case of the isolated antibody, or antigen-binding portion thereof, as taught herein, a nucleic acid encoding such an antibody, or antigen-binding portion thereof, is placed into one or more expression constructs, e.g., expression vector(s). Such expression vector(s) is/are subsequently transfected into host cells. In present disclosure a linear nucleic acid sequence, to be placed into one or more expression constructs, has been generated by selection of preferred codons encoding the amino acids comprising the antibody, or the antigen-binding portion thereof, as taught herein.

Molecular cloning techniques are known in the art and described, for example in Ausubel F M (1987) Current Protocols in Molecular Biology. New York. N.Y., John Wiley & Sons or Sambrook, Fritsch and Maniatis Molecular Cloning: a laboratory manual Cold Spring Harbor N.Y. Cold Spring Harbor Laboratory Press. A wide variety of cloning and in vitro amplification methods are suitable for the construction of recombinant nucleic acids.

Present invention further provides for a nucleic acid comprising:
  a) a nucleic acid sequence according to SEQ ID NO: 5;
  b) a nucleic acid sequence according to SEQ ID NO: 6; and
  c) a nucleic acid sequence according to SEQ ID NO: 7;
  and/or comprises:
    d) a nucleic acid sequence according to SEQ ID NO: 8;
    e) a nucleic acid sequence according to SEQ ID NO: 9; and
    f) a nucleic acid sequence according to SEQ ID NO: 10.

As provided, CDR1 of the heavy chain of said antibody is encoded by the nucleic acid sequence of SEQ ID NO: 5 (AGTGATTATGCCTGGAAC), CDR2 of the heavy chain of said antibody is encoded by the nucleic acid sequence of SEQ ID NO: 6 (TACATAAGCTACAGTGGTAACACT-TACTACAACCCATCTCTCAAAAGT), CDR3 of the heavy chain of said antibody is encoded by the nucleic acid sequence of SEQ ID NO: 7 (AACTACGTTCGC).

As provided, CDR1 of the light chain of said antibody is encoded by the nucleic acid sequence of SEQ ID NO: 8 (AAGTCAAGTCAGAGCCTCTTATATACTAATG-GAAAAACCTATTTGAAT), CDR2 of the light chain of said antibody is encoded by the nucleic acid sequence of SEQ ID NO: 9 (CTGGTGTCTAAATTGGACTCT) and CDR3 of the light chain of said antibody is encoded by the nucleic acid sequence of SEQ ID NO: 10 (TTGCAGAGTT-CACATTTTCCTCACACG).

The linear nucleic acid sequences as provided herein in SEQ ID NO: 1 and/or SEQ ID NO: 2 may encode the antibody, or antigen-binding portion thereof, as taught in the present invention. Moreover, the nucleic acid as provided herein may encode the antibody, or antigen-binding portion thereof, that competes on binding the same epitope and/or an overlapping epitope with the antibody, or antigen-binding portion thereof. In other words, the nucleic acid may have at least 50%, at least 55%, at least 60%, at least 65%, at least 70%, at least 80%, at least 85%, at least 90%, at least 95%, 96%, 97%, 98%, 99%, 100% nucleic acid sequence identity to SEQ ID NO 1 and/or of SEQ ID NO: 2, for example by encoding an amino acid sequence of an antibody, or antigen-binding portion thereof, with at least 50%, at least 55%, at least 60%, at least 65%, at least 70%, at least 80%, at least 85%, at least 90%, at least 95%, 96%, 97%, 98%, 99%, 100% amino acid sequence identity to the amino acid sequence of the isolated antibody, or the antigen-binding portion, thereof, comprising SEQ ID NO: 3 and/or SEQ ID NO: 4 and/or encoding an amino acid sequence of an antibody, or antigen-binding portion thereof, with at least 50%, at least 55%, at least 60%, at least 65%, at least 70%, at least 80%, at least 85%, at least 90%, at least 95%, 96%, 97%, 98%, 99%, 100% amino acid sequence identity to the amino acid sequence of the herein provided CDRs as represented by SEQ ID NO: 11, SEQ ID NO: 12, SEQ ID NO: 13, SEQ ID NO: 14, SEQ ID NO: 15, and SEQ ID NO: 16.

Many known techniques and protocols for manipulation of nucleic acid sequences, for example, in the preparation of nucleic acid constructs, mutagenesis, introduction of DNA into cells and gene expression and analysis of protein may be used. Said techniques are for example described in handbooks such as The Nucleic Acid Protocols Handbook edited by Ralph Rapley, Volume 2000 and/or The Protein Protocols Handbook, edited by John M. Walker, Volume 1996 and/or Ausubel F M (1987) Current Protocols in Molecular Biology. New York. NY, John Wiley & Sons.

The nucleic acid sequence may be comprised in a host cell. A host cell may comprise a nucleic acid and/or an expression vector and/or a viral vector, which has/have been introduced in the host cell per molecular cloning technique known to the person skilled in the art. Preferably the host cell is isolated. Typically such a host cell, transfected with a nucleic acid and/or an expression vector and/or a viral vector, is subsequently able to express an antibody, or antigen-binding portion thereof, encoded by the nucleic acid that may be comprised in the expression vector and/or viral vector, preferably wherein the nucleic acid sequence is selected from SEQ ID NO: 1, SEQ ID NO: 2, SEQ ID NO: 5, SEQ ID NO: 6, SEQ ID NO: 7, SEQ ID NO: 8, SEQ ID NO: 9 and/or SED ID NO: 10. The nucleic acid sequence that may be comprised in the expression vector and/or viral vector may comprise a signal sequence, for example the signal sequence(s) of SEQ ID NO: 17 and/or SEQ ID NO: 18. The nucleic acid sequence that may be comprised in the expression vector and/or viral vector can for example be the nucleic acid sequence(s) of SEQ ID NO: 21 and/or SEQ ID NO: 22. Suitable host cells for expression vectors and/or viral vectors can be bacterial cells or mammalian cells. Such bacterial cells may include but are not limited to *Escherichia coli, Streptococcus aureus, Corynebacterium glutamicum, Pseudomonas putida,* or *Bacillus megaterium.* Such mammalian cells include, but are not limited to, for example simian COS cells, HEK-293 cells, BHK cells, Sp2/O cells, or Chinese Hamster Ovary (CHO) cells.

Therefore, the invention further relates to a host cell comprising a nucleic acid according to the invention.

In one example, a nucleic acid and/or an antibody, or antigen-binding portion thereof, according to the invention is produced by cultivating a host cell. The host cell is cultivated under conditions sufficient to produce the nucleic acid encoding the antibody, or antigen-binding portion thereof, e.g. as described herein and/or as known in the art. A wide variety of combinations of host cells can be employed in expressing the antibody, or antigen-binding portion thereof.

Host cells according to the invention, utilized to produce an antibody, or antigen-binding portion thereof, as taught herein can be cultivated in a variety of media, depending on the cell-type used. The skilled person is able to select a medium suitable for cultivation without undue burden.

In an aspect of the invention a process for producing an antibody, or antigen-binding portion thereof, is provided. The process for producing an antibody, or antigen-binding portion thereof, comprises a method of transfection, wherein a host cell is transfected with a nucleic acid, preferably a nucleic acid encoding an antibody, or antigen-binding portion thereof, of the invention. Such a transfection may be enabled by allowing an expression vector and/or viral vector to introduce a nucleic acid in a host cell. Therefore, the invention further relates to a process for producing an antibody, or antigen-binding portion thereof, wherein the process comprises cultivating the host cell according to the invention comprising a nucleic acid, an expression vector or a viral vector, expressing an antibody, or antigen-binding portion thereof, and obtaining the antibody, or antigen-binding portion thereof, encoded by said nucleic acid, expression vector or viral vector from the culture.

In the process for producing an antibody the host cell according to the invention is cultivated. Particularly, the host cell comprises a nucleic acid as taught herein. Also the host call may comprise an expression vector comprising a nucleic acid encoding the antibody, or antigen-binding portion thereof, as taught herein, or may comprise a viral vector, comprising a nucleic acid encoding an antibody, or antigen-binding portion thereof. Subsequently to expression of the nucleic acid, the expression vector or the viral vector, an antibody, or antigen-binding portion thereof, encoded by said nucleic acid, expression vector or viral vector is obtained from the culture.

The skilled person is able to select and use the proper vectors, nucleic acid sequences, and host cells without undue burden.

Means for introducing an isolated nucleic acid molecule or a gene construct into a cell for expression are known to those skilled in the art. The technique used for a given cell depends on the known methods and techniques of the skilled person. Such methods include, but are not limited to, microinjection, transfection mediated by DEAEdextran, transfection mediated by liposomes such as by using lipofectamine and/or cellfectin, PEG-mediated DNA uptake, electroporation, viral transduction and microparticle bombardment such as by using DNA-coated tungsten or gold particles, and the like.

Vectors for expression in cells are widely available. Vector components generally include, but are not limited to, one or more of the following: a signal sequence, a sequence encoding an antibody, or antigen-binding portion thereof, of the present invention (e.g., derived from the information provided herein), an enhancer element, a promoter, and a transcription termination sequence.

The present invention further provides an expression vector that includes a polynucleotide sequence or nucleic acid encoding the antibody, or antigen-binding portion thereof, according to the invention, or encoding the antibody, or antigen-binding portion thereof, that competes for binding the epitope of alpha-Syn with the antibody, or antigen-binding portion, according to present invention.

Present invention further relates to a viral vector. A viral vector, as disclosed herein, may be an Adeno-associated virus (AAV) viral vector, preferably the viral vector is a recombinant AAV (rAAV). However, any suitable viral vector, or any AAV of any serotype can be used. However, some serotypes are more suitable for use in transducing cells of the CNS than others. The viral vector in one aspect comprises a nucleic acid, encoding the antibody, or antigen-binding portion thereof, according to the invention, or encoding the antibody, or antigen-binding portion thereof, that competes for binding the epitope with the antibody, or antigen-binding portion as taught herein. The skilled person is aware of the therapeutic potential of AAV viral vectors and is aware that the properties of an AAV are ideal for transfection purposes.

AAVs in general exhibit excellent properties for use in gene therapy. In one aspect AAV viral vectors may express a nucleic acid encoding an antibody, or antigen-binding portion thereof, as taught herein, to mediate beneficial effects intracellularly and/or extracellularly and/or transcellularly, i.e. by binding intracellular and/or extracellular alpha-Syn and/or by binding alpha-Syn in distal cells, preferably binding intracellular alpha-Syn oligomers and/or extracellular alpha-Syn oligomers and/or by binding alpha-Syn oligomers in distal cells, more preferably binding intracellular alpha-Syn oligomers and/or extracellular alpha-Syn oligomers and/or by binding alpha-Syn oligomers in distal cells with a higher binding affinity than when binding alpha-Syn fibrils.

In one aspect of the invention the beneficial effect induced by transduction of cells of the CNS by the AAVs of present invention, results from the method of delivering a medicament or pharmaceutical composition to a subject suffering from a disease, particularly a neurodegenerative disease, comprising an AAV viral vector comprising a nucleic acid and/or polynucleotide sequence as taught in present invention, encoding an antibody, or antigen-binding portion, of present invention.

In one aspect, the nucleic acid encoding the antibody as taught herein is preceded by a signal sequence, encoding a signal peptide (sometimes referred to as signal sequence, targeting signal, localization signal, localization sequence, transit peptide, leader sequence or leader peptide) The skilled person is aware that any signal sequence, encoding any signal peptide known in the art, may be selected, and that the signal sequence to be used in present invention is not limited to the ones encoded by the nucleic acid sequences described by SEQ ID NO: 17 and/or SEQ ID NO: 18.

Pharmaceutical Composition

One aspect of the invention provides for a pharmaceutical composition comprising the antibody, or antigen-binding portion thereof, or the nucleic acid or an expression vector, or the viral vector according to the invention.

Herein provided is the pharmaceutical composition comprising the antibody, or the antigen-binding portion thereof, according to the invention. As such, the pharmaceutical composition may comprise the antibody disclosed by present invention, or the antigen-binding portion competes thereof, for example a Fab fragment, a F(ab')2 fragment, a scFv fragment, a Fd fragment, a dAb fragment, or a CDR fragment of the antibody, preferably selected from the CDRs as described by amino acid sequences SEQ ID NO: 5, SEQ ID NO: 6, SEQ ID NO: 7, SEQ ID NO: 8, SEQ ID NO: 9, and/or SEQ ID NO: 10. The antibody, or antigen-binding portion thereof, may be formulated for parenteral, topical, intraparenchymal, enteral or local administration, aerosol formulation, nebulizer formulation, or transdermal formulation. The skilled person is aware of suitable formulations for different administration routes.

A pharmaceutical composition as taught herein is a composition for use as a medicament, for example as a pharmaceutical product, a drug, a medicinal product and the like.

In one aspect the invention provides the use of the antibody, or antigen-binding portion thereof, binding alpha-Syn, preferably binding alpha-Syn oligomers. In a further aspect the antibody, or antigen-binding portion thereof, according to the invention is provided for lowering levels of alpha-Syn, preferably for lowering levels of alpha-Syn oligomers in a biological tissue and/or fluid of a subject, such as in a non-limiting example the neuronal cell, glial cell, astrocytes, cerebrospinal fluid, blood, saliva and the like.

The pharmaceutical composition can be administered for prophylactic and therapeutic use. More specifically, the pharmaceutical composition as defined herein may be used in the treatment, prevention, slowing of progression, or alleviation of a disease, preferably a neurodegenerative disease.

In an aspect the pharmaceutical composition comprises a pharmaceutically acceptable carrier. Such a carrier may comprise a diluent, excipient and the like, or may comprise lipid-based carriers (e.g. liposomes, micelles), hydrogels and particle-based carriers (e.g. nanoparticles). A skilled person is able to select a suitable pharmaceutically acceptable carrier without undue burden.

Present invention further provides that the pharmaceutical composition may comprise the nucleic acid encoding the antibody, or antigen-binding portion thereof, according to present invention. Further, the pharmaceutical composition may comprise the expression vector comprising said nucleic acid, and/or may comprise the viral vector comprising said nucleic acid.

The pharmaceutical composition comprising an antibody, or antigen-binding portion thereof, as taught herein, or a nucleic acid as taught herein, or an expression vector as taught herein, or a viral vector as taught herein may be administered to a subject and/or by a subject for use in the treatment, or the prevention, or slowing down of the progression and/or alleviating the symptoms and/or the condition of a disease, preferably a neurodegenerative disease.

In an aspect of the invention a method for treating, preventing, ameliorating or alleviating a disease, particularly a neurodegenerative disease, or slowing the progression of a disease, particularly a neurodegenerative disease is provided.

As disclosed herein, a neurodegenerative disease, particularly a neurodegenerative disease that is an alpha-Syn related neurodegenerative disease, that may be treated, prevented, slowed down or alleviated by a pharmaceutical composition, as taught herein, is selected from the group comprising Parkinson disease (PD), progressive supranuclear palsy (PSP), multiple system atrophy (MSA), corticobasal degeneration (CBD), vascular Parkinsonism (VaP), and other parkinsonian syndromes, Parkinson Disease Dementia, Frontotemporal Dementia, Dementia with Lewy Bodies and Traumatic Brain Injury.

As taught herein, a subject comprises a mammalian subject, for example, but not limited to, a human, a murid, for example a murine, or a monkey, or a domestic animal, for example a dog, cat, sheep, cow and the like.

A pharmaceutical composition can be administered to a subject and/or by a subject in a variety of unit dosage forms depending on the method of administration of said pharmaceutical composition. For administration the typical dosage of the pharmaceutical composition as disclosed herein of present invention may be in the range from about 0.00001 to about 100 mg/kg, about 0.0001 to about 10 mg/kg, or about 0.001 to about 1 mg/kg, kg refers to the subject's body weight, or in the range from, for example, about $1\times10^{10}$ vg/kg to about $1\times10^{15}$ vg/kg, wherein vg/kg refers to vector genomes per kilogram of the subject's body weight. The skilled person is able to adjust the dosage to obtain a preferred dose suitable for the condition to be treated, alleviated, prevented or slowed down. The amount of the dosage of the pharmaceutical composition as taught herein is sufficient to produce an effect that may be considered a therapeutic and/or prophylactic effect by the skilled person. Thus, the dosage, provided by the invention, administered is considered therapeutically and/or prophylactically effective.

A dosage of a pharmaceutical composition as provided herein may be given in a daily dose which is administered by the subject or administered to the subject at a frequency of for example at least one daily dose, two daily doses, or multiple daily doses. Alternatively the pharmaceutical composition may be administered once every two days, three days, four days, bi-weekly, or once a week, once every two weeks or once a month and the like. The pharmaceutical composition may also be administered only once.

The dosage of a pharmaceutical composition as provided herein may be given to a subject per administration of a single bolus, or a single dose, or multiple divided doses.

Administration of the dosage of the provided pharmaceutical composition according to the invention may be administered at least once per day, at least once per week, at least once every two weeks, at least once a month, at least once every three months, or the like.

Dosage regimens may be adjusted by a skilled person to provide the optimal prophylactic or therapeutic response. For example, a single bolus may be administered, a single bolus followed by several divided doses may be administered over time, several divided doses may be administered over time, or administration is per continuous infusion.

The pharmaceutical composition as disclosed herein may be combined with other agents suitable for administration, for example in a combination therapy. The administration of the combination of the disclosed pharmaceutical composition and a suitable agent may be consecutively or simultaneously.

In a further aspect the pharmaceutical composition as disclosed herein may comprise a nucleic acid, or an expression vector or a viral vector. Preferably, the viral vector is an AAV. In one aspect the nucleic acid is included in an expression vector or in a viral vector. The nucleic acid, or expression vector, or viral vector as described herein may be formulated for administration by parenteral or intraparenchymal route, for example by infusion or by injection.

The formulation of the pharmaceutical composition comprising a nucleic acid and/or an expression vector and/or a viral vector may be in a sterile suspension or solution, for example formulated to a composition comprising distilled water, or saline, or phosphate buffered saline, or a dextrose solution, and/or other pharmaceutically acceptable excipients for injection and/or infusion.

Pharmaceutical compositions, such as the ones described herein, are generally sterile, and are stable for a period of time under conditions of preferred manufacture and preferred storage.

In Vitro or Ex Vivo Methods and Diagnostic Method

Present invention provides an in vitro method comprising binding the antibody, or antigen-binding portion thereof, according to the invention, to alpha-Syn, preferably to alpha-Syn oligomer.

In another aspect the invention provides an ex vivo method comprising binding the antibody, or antigen-binding portion thereof, according to the invention, to alpha-Syn, preferably to alpha-Syn oligomer.

In one aspect the invention provides the use of the antibody, or antigen-binding portion thereof, as disclosed herein for binding alpha-Syn, preferably for binding alpha-Syn oligomers.

As is evident to the skilled person, various in vitro methods and ex vivo methods for detecting and/or quantifying the antibody, or antigen-binding portion thereof, according to present invention can be contemplated herein. Such in vitro or ex vivo methods may comprise imaging methods or methods useful for assessing binding affinity. In these methods the antibody, or antigen-binding portion thereof, is conjugated with a molecule suitable for detection. Such molecule can be any molecule that emits a signal detectable by a standard imaging technique. Any secondary agent may also be used. Non-limiting examples of a molecule, suitable for detection, may be a fluorescent agent, chemiluminescent agent, a radioactive ligand, a PET tracer or an MRI-imaging biomarker, a metal, a substance with a specific magnetic resonance spectrum, an electromagnetic emitting substance, or a ferromagnetic substance, an X-ray emitting, X-ray reflecting or X-ray absorbing substance.

The in vitro or ex vivo methods that present invention contemplates comprise, but are not limited to, Western blotting, immunohistochemistry, ELISA, immunocytochemistry, Flow cytometry, FACS, immunoprecipitation, Fluorescence Resonance Energy Transfer (FRET), amplified luminescent proximity homogeneous assay, bead-based assay technology, Surface Plasmon Resonance (SPR), biolayer interferometry or Enzyme Linked ImmunoSpot (ELISpot).

The in vitro or ex vivo method as disclosed herein comprises a process of producing an antibody, or antigen-binding portion thereof, according to the invention for providing the antibody, or antigen-binding portion thereof, for use in an in vitro method and/or an ex vivo method.

In one aspect, the invention provides an in vitro or ex vivo method comprising: contacting the antibody, or the antigen-binding portion thereof, to a biological sample for detecting and/or quantifying the presence of alpha-Syn oligomer, by using the antibody, or the antigen-binding portion thereof, according to the invention.

The in vitro or ex vivo method according to the invention is suitable for detection and/or quantification of alpha-Syn monomers, and/or alpha-Syn fibrils, and/or alpha-Syn oligomers. In particular, the methods are suitable for detection and/or quantification of alpha-Syn oligomers, preferably for detection and/or quantification of alpha-Syn oligomers in a ratio of 20 or more, 30 or more, 50 or more, compared to alpha-Syn fibrils and/or to alpha-Syn monomers, i.e. alpha-Syn fibrils and/or alpha-Syn monomers:alpha Syn oligomers, for example reported as $10\hat{\ }\log EC50_{fibrils}$ and/or $10\hat{\ }\log EC50_{monomer}$: $10\hat{\ }\log EC50_{oligomer}$.

The in vitro or ex vivo method according to the invention is further suitable for the detection of alpha-Syn oligomers, and/or alpha-Syn monomers, and/or alpha-Syn fibrils in a sample obtained from a subject. In present invention alpha-Syn oligomers, and/or alpha-Syn monomers, and/or alpha-Syn fibrils may be detected by standard techniques, preferably alpha-Syn oligomers are detected. As a non-limiting example the detection comprises immunohistochemistry.

In one aspect an in vitro method or ex vivo method for quantification of the antibody, or antigen-binding portion and/or alpha-Syn monomers, and/or alpha-Syn fibrils and/or alpha-Syn oligomers is provided. The method for quantification relates to the steps of:

detecting an amount of the antibody, or antigen-binding portion thereof, that is bound to an alpha-Syn monomer, and/or an alpha-Syn fibril, and/or an alpha-Syn oligomer in a sample;

measuring the amount of the antibody, or antigen-binding portion thereof, that is bound to alpha-Syn monomers, and/or alpha-Syn fibrils, and/or alpha-Syn oligomers in a sample;

quantifying the amount of the antibody, or antigen-binding portion thereof, that is bound to alpha-Syn monomers, and/or alpha-Syn fibrils, and/or alpha-Syn oligomers in a sample by means of standard methods known in the art, such as the non-limiting example of ELISA.

As disclosed herein the quantification and/or the detection of alpha-Syn and/or alpha-Syn oligomer may have experimental purposes, diagnostic purposes or purposes related to the treatment of a subject. In a non-limiting example a purpose may be to monitor the progression of the neurodegenerative disease in a subject.

In another aspect, the in vitro method or ex vivo method, disclosed by present invention, is suitable as a diagnostic tool. In other words, the in vitro method or ex vivo method according to the invention comprises a method useful for diagnosing a disease, preferably a neurodegenerative disease. For example, the in vitro method or ex vivo method as disclosed herein comprises detecting and/or quantifying alpha-Syn, particularly alpha-Syn oligomers in a sample obtained from a subject. In a further aspect the detection and/or quantification of alpha-Syn, particularly alpha-Syn oligomers, in a sample further provides the skilled person with sufficient means to diagnose the stage of a, preferably neurodegenerative, disease in said sample obtained from said subject, and/or in said subject.

In a further aspect the method for diagnosing a disease, preferably wherein the disease is a neurodegenerative disease, comprises differentiating different forms of alpha-Syn (i.e. alpha-Syn monomers, alpha-Syn oligomers and/or alpha-Syn fibrils).

In a further aspect the method for diagnosing a disease, preferably wherein the disease is a neurodegenerative disease, comprises detecting and/or quantifying alpha-Syn, preferably alpha-Syn oligomers, by using the antibody, or antigen-binding portion thereof, according to the invention in a sample obtained from a subject. The diagnostic method as provided comprises detecting the presence of alpha-Syn, particularly the presence of alpha-Syn oligomers, in a sample obtained from a subject. Further, the diagnostic method comprises detecting and/or quantifying an amount of alpha-Syn, particularly an amount of alpha-Syn oligomers, in a sample obtained from a subject.

Various diagnostic assay techniques known in the art can be used. Non-limiting examples of such assays are immunoprecipitation assays, direct or indirect sandwich ELISA assays, competitive binding assays and the like. In such assays the antibody, or antigen-binding portion thereof, can comprise a detectable molecule, for example an imaging marker, such as, in a non-limiting example, a fluorescent agent, chemiluminescent agent, a radioactive ligand, a PET tracer or an MRI-imaging biomarker, a metal, a substance with a specific magnetic resonance spectrum, an electromagnetic emitting substance or a ferromagnetic substance, an X-ray emitting, reflecting or absorbing substance. Further, in said diagnostic assays the nucleic acid, or the expression vector, or the viral vector can comprise a sequence encoding a suitable detection molecule.

In an aspect the biological sample as used in the in vitro or ex vivo is a sample obtained from a subject. The sample obtained from a subject may be obtained post-mortem. The sample may be obtained from the tissue of a subject, such as the brain, gut, skin, colon, muscle, salivary gland tissue, or nerve, or may be obtained from or from a biological fluid of a subject, such as cerebrospinal fluid, blood, urine or saliva. The sample used in the methods may be pre-treated or processed before combining the sample with the antibody, or antigen-binding portion thereof. The skilled person is aware of standard methods and standard processes, known in the art, to pre-treat samples. The antibody, or antigen-binding portion thereof, is combined with the sample under conditions suitable for allowing binding of the antibody, or antigen-binding portion thereof, to alpha-Syn monomers and/or alpha-Syn fibrils, and/or alpha-Syn oligomers.

As may be apparent from precedent description the in vitro and ex vivo methods may require the use of suitable control, e.g. a normal or healthy individual subject, or a typical population, i.e. a group of similar individual subjects, for instance represented by a data set, e.g. for the use in quantification.

As provided herein a healthy or normal individual subject is a subject that has not been diagnosed with a neurodegenerative disease, preferably an alpha-synucleinopathy, i.e. a subject that does not display any symptoms or typical characteristics related to the diseased state, or is a subject that is not at risk of developing a neurodegenerative disease.

In a further aspect the antibody, or antigen-binding portion thereof, is used in a in vivo assay for use in various biomedical applications, including, but not limited to surgery, diagnosis of a disease, imaging of brains, monitoring of organ condition, tomographic imaging of organs, and the like. Particularly, present invention comprises a method for diagnosing a disease, preferably a neurodegenerative disease, comprising administering an antibody, or antigen-binding portion thereof, or a nucleic acid, or an expression vector, or a viral vector to a subject, wherein the antibody, or antigen-binding portion thereof comprises a detectable molecule, for example an imaging marker, such as, in a non-limiting example, a fluorescent agent, chemiluminescent agent, a radioactive ligand, a PET tracer or an MRI-imaging biomarker, a metal, a substance with a specific magnetic resonance spectrum, an electromagnetic emitting substance or a ferromagnetic substance, an X-ray emitting, X-ray reflecting or X-ray absorbing substance. or wherein the nucleic acid, or the expression vector, or the viral vector comprise a sequence encoding a suitable molecule for detection for diagnostic methods comprising for example MRI, MR spectrometry, PET imaging, fluorescent imaging, CT and such. For example, the neurodegenerative disease displaying alpha-Syn oligomers can be detected using immune-PET imaging.

It will be appreciated by persons skilled in the art that numerous variations and/or modifications may be made to the above-described aspects and/or embodiments, without departing from the broad general scope of the present invention. The present aspects and/or embodiments are, therefore, to be considered in all respects as illustrative and not restrictive. The present invention includes the following non-limiting examples.

BRIEF DESCRIPTION OF THE FIGURES

FIG. 2A depicts binding affinities of antibody 26F1 to alpha-Syn oligomers, alpha-Syn monomers and alpha-Syn fibrils as determined by ELISA in pM at different concentrations.
B:
FIG. 2B depicts binding affinities of antibody 5G4 to alpha-Syn oligomers, alpha-Syn monomers and alpha-Syn fibrils as determined by ELISA in pM at different concentrations.
C:
FIG. 2C depicts binding affinities of antibody MJFR14 to alpha-Syn oligomers, alpha-Syn monomers and alpha-Syn fibrils as determined by ELISA in pM at different concentrations.

FIG. 6b depicts the specificity of MJFR14 for ASO (alpha-synuclein oligomers), compared to ABO (alpha-beta oligomers), AB fibrils (alpha-beta fibrils), TAU oligo (tau oligomers), TAU fibrils (tau fibrils).

EXAMPLES

Figure 7:
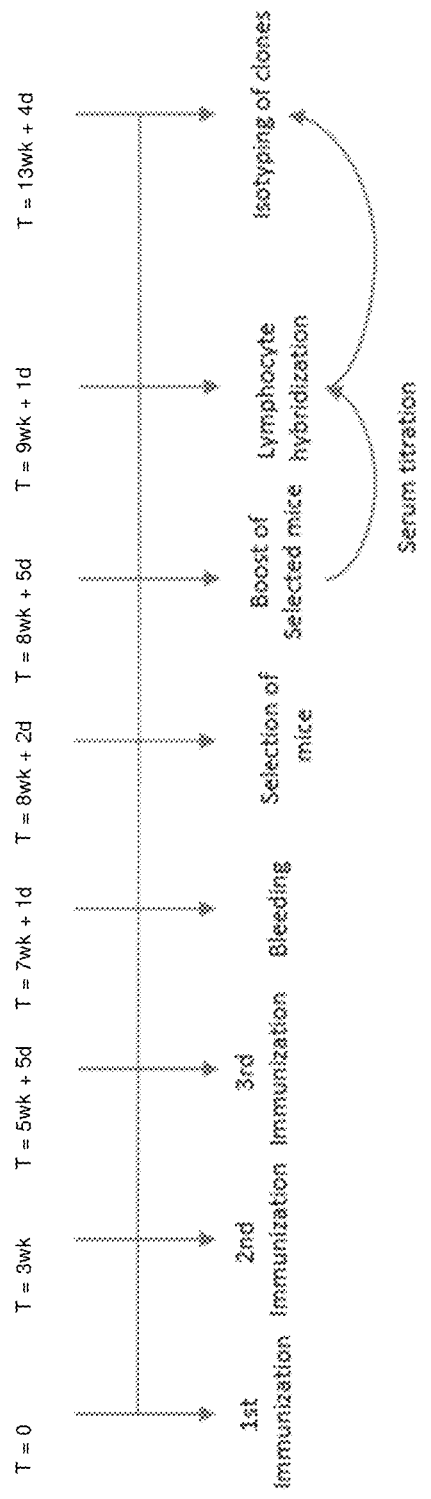
FIG. 7 shows the utilized scheme for immunization.

Example 1—Generation of Mouse Monoclonal Antibodies Against Oligomeric Form of Alpha-Synuclein The following protocol applies to the production of the monoclonal antibody against alpha-Syn oligomer. The production of said antibody, or antigen-binding portion thereof, is preceded by an immunization phase, as is generally known by the skilled person to be a method of generating monoclonal antibodies. The utilized scheme for said immunization is provided in FIG. 7.

Example 2—Screening of the Generated Monoclonal Antibodies Coating of the Microplate Preparation of the coating solution (12 ml/plate): The protein is diluted into coating buffer, final concentration 0.1 µg/mL, in a polypropylene recipient.

The microplate is coated by adding 100 µl of the coating solution to each well of the plate. Incubate the plate overnight (16-20 hours) at +2-8° C.

After the overnight coating, the coating solution is removed, the plate is washed and the plate is tapped dry. After washing, 300 µL of blocking buffer is added to each well. The blocking buffer is incubated for 2 hours (+/−10 min) at room temperature.

ELISA Screening

1. Pipette 100 µl of the respective antibody dilution samples (dilution series: 1 µg/mL antibody starting concentration with 10× dilution steps) into each of the wells. Cover the strips with an adhesive sealer. Incubate 60±2 min. at room temperature.
2. Wash each well 5 times with 300 µl wash solution, then empty the wells.
3. Pipette 100 µl of 1/5000 diluted peroxidase-labeled anti-mouse antibody or anti-rabbit antibody (depending on species of the positive control mAb) into each of the microplate wells. Cover the strips with an adhesive sealer.
4. Incubate for 30±2 min. at room temperature (+18° C. to +30° C.).

5. Wash each well 5 times with 300 µl wash solution, then empty the wells.
6. Pipette 100 µl of chromogen/TMB-substrate solution into each well. Incubate for a standardized time of at least 5 min. up to 30±2 min. at room temperature (+18° C. to +30° C.), protected from light.
7. To stop the reaction, add 100 µl stop solution (0.5M sulphuric acid) and gently mix.
8. Place the microplate in an appropriate plate reader for photometric measurement. Read the absorbance of each well at a wavelength of 450 nm and reference wavelength of 600-650 nm, within 15 minutes of adding the stop solution.

Example 3—Binding Affinity & Specificity Determined Using ELISA

The binding affinities and binding specificities of the antibody as taught herein and of the reference antibodies have been determined using ELISA. The reference antibodies 5G4 and MJFR14 have been used as reference. 5G4 antibody is an antibody that specifically recognizes alpha-Syn oligomers and alpha-Syn fibrils. MJFR14 antibody is an antibody that specifically recognizes most variants of alpha-Syn (alpha-Syn monomers, alpha-Syn oligomers, alpha-Syn fibrils).

Estimation of EC50 Values and Ratios of Binding Affinities

Binding affinities (EC50 values) towards different antigens were determined from ELISA experiments using antigen coated plates as follows. Absorbance data was corrected for background absorption obtained by incubating antigen coated plates without adding primary antibody but keeping all other parameters constant. The background corrected absorbance values were then plotted against the log value of the antibody concentration.

The curve was fitted using the Graphpad Prism software using the common binding function Abs450=Max/(1+10^(([Log EC50–Log Ab]))) where "Abs450" is the background corrected experimental absorption, "Max" is the absorption upon complete binding saturation, "Log EC50" is the log of the EC50 value and "Log Ab" is the log of the antibody concentration.

Reported binding affinities are reported as the ratio of EC50 values towards different antigens (e.g. 10^log EC50$_{monomer}$/10^log EC50$_{oligomer}$).

Results

Figure 1:
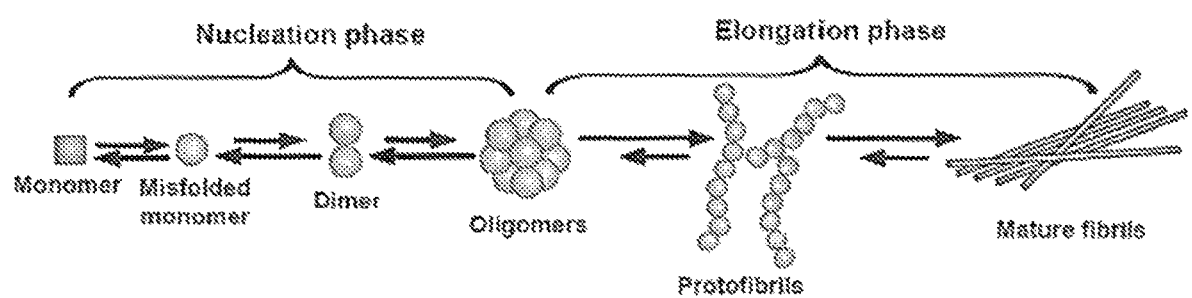
FIG. 1 shows a schematic simplified depiction of the various alpha-synuclein species occurring in the brain.
Figure 2:
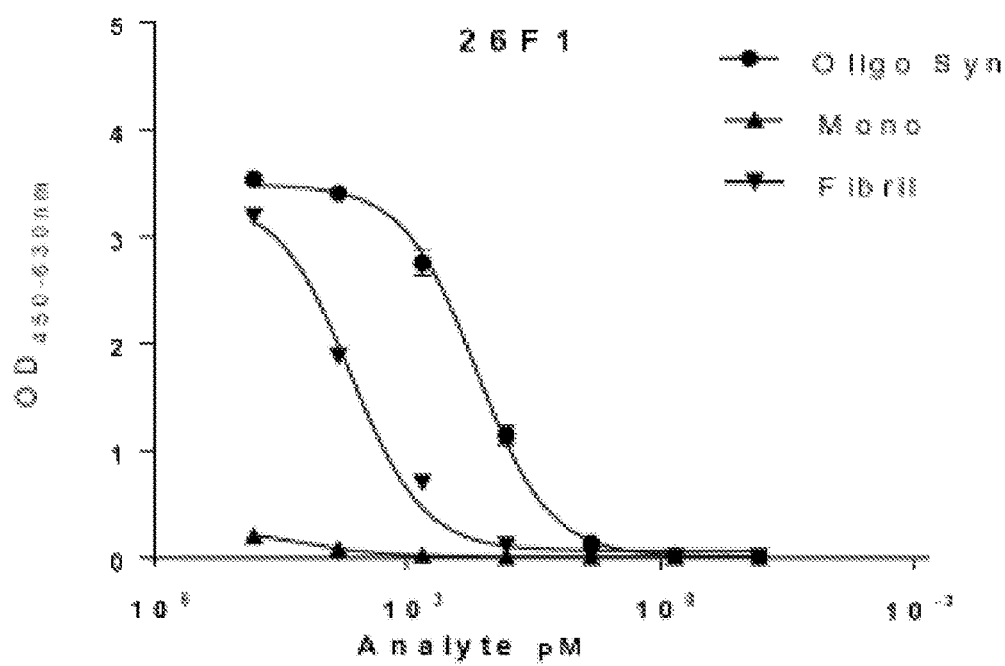
FIG. 2
A.
Figure 2:
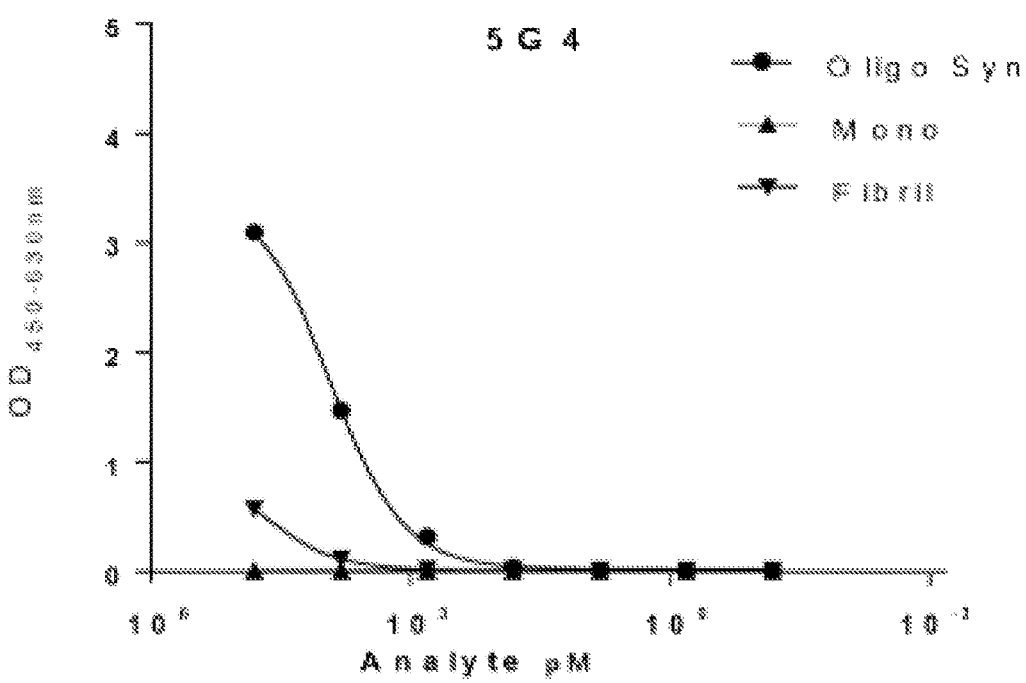

It has been observed that the MJFR14 antibody (see FIG. 2C) displays similar binding affinity to monomers, fibrils and oligomers alike. In accordance to the literature (Kovacs et al. 2012 DOI 0.1007/s00401-012-0964-x), the 5G4 antibody displays a binding affinity for alpha-Syn fibrils and alpha-Syn oligomers, and does not bind alpha-Syn monomers. As observed herein the 5G4 antibody (see FIG. 2B) displays higher binding affinity for alpha-Syn oligomers and a lower affinity for the other variants of alpha-Syn. The antibody 26F1 (see FIG. 2A) displays a very high binding affinity to alpha-Syn oligomers, and only appears to bind alpha-Syn monomer when applied in higher concentrations.

Figure 3:
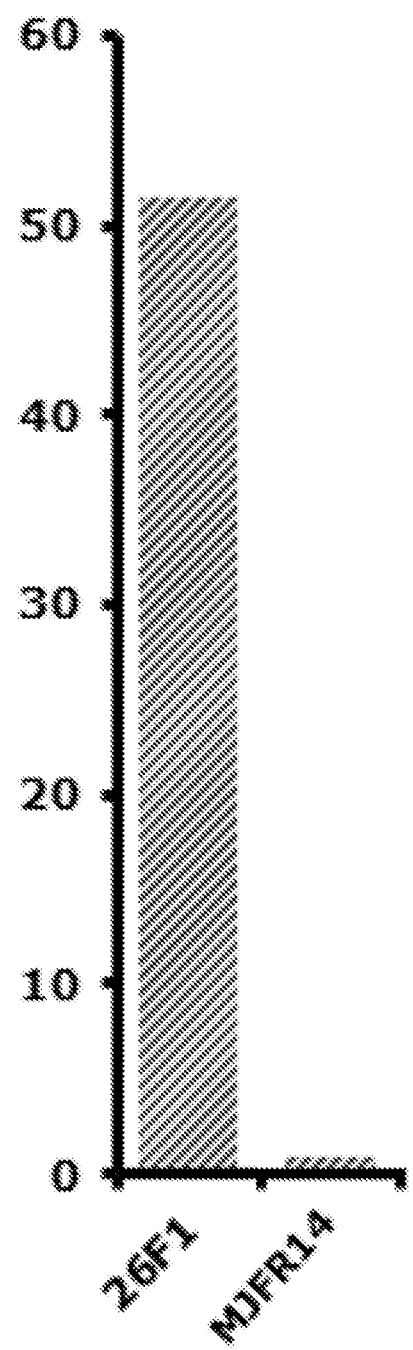
FIG. 3 shows the ratio EC50 alpha-Syn oligomers:alpha-Syn fibrils for 26F1 compared to reference antibody MJFR14.

From the experiment as disclosed in this example it is apparent that the 26F1 antibody prefers binding to alpha-Syn oligomers over binding to alpha-Syn fibrils. More specifically a ratio of the binding affinity of alpha-Syn oligomers: alpha-Syn fibrils of more than 30 was determined, even more than 50 was determined (see FIG. 3). In other words, the binding of 26F1 antibody to alpha-Syn oligomers is preferred over the binding of 26F1 antibody to alpha-Syn fibrils by 20-fold, 30-fold, or even by 50-fold. In contrast, MJFR14 displays a low ratio of alpha-Syn oligomers:alpha-Syn fibrils (see FIG. 3). This may indicate reduced specificity for alpha-Syn oligomers, when compared to fibrillary and monomeric alpha-Syn.

TABLE 1

Binding properties of alpha-synuclein antibodies to alpha-synuclein oligomers as determined by ELISA

| Clone ID | EC50 (pM) exp 1 | EC50 (pM) exp 2 | EC50 (pM) exp 3 |
| --- | --- | --- | --- |
| 26F1 | 39 | 27 | 90 |
| MJFR14 | 60 | 60 | 140 |
| 5G4 | 200 | 600 | 600 |

Example 4—Immunoreactivity of Novel Conformational Alpha-Synuclein Antibody on Human Postmortem Brain Tissue The following protocol applies to the detection of alpha-Syn oligomers in human postmortem brain material by any of the antibodies, or antigen-binding portions thereof, of the present invention.

Introduction

Alpha-synuclein (alpha-Syn) is the main protein implicated in the pathogenesis of Parkinson's disease (PD), whereas, neuropathologically Lewy bodies (LBs) and Lewy neurites (LNs) are the defining lesions of the disease. Alpha-Syn is 140 amino acid protein that is highly abundant in the brain, where it is primarily localized in presynaptic terminals. It is also expressed in the spinal cord, spinal ganglia, red blood cells, plasma, serum, cerebrospinal fluid (CSF), saliva, skin nerves and many other peripheral tissues such as: colon and submandilar glands. Although a great interest has emerged about the likely pathogenic significance of alpha-Syn, its normal function remains poorly understood. Strong evidence for a major role of alpha-Syn in vesicle trafficking, synaptic plasticity and neurotransmitter release supported by its intracellular localization in the presynaptic terminals has been brought forward by model systems. Native alpha-Syn exist as unfolded monomer, however, under certain conditions, alpha-Syn monomers undergo a conformational transition, in which soluble monomers initially form oligomers and eventually form the large insoluble amyloid fibrils. It is currently thought that the oligomers are main contributors towards disease progression, but antibodies that specifically recognize such oligomers are scarce.

The characterization of alpha-Syn pathology in the brain has relied heavily on the use of alpha-Syn antibodies, the vast majority of which recognize monomeric, oligomeric and fibrillary forms of alpha-Syn alike. Anti-alpha-Syn conformation-specific antibodies may unveil underappreciated alpha-Syn neuropathology or even reveal novel neuropathological features in the brain of patients with PD or related disorders. Furthermore, taking into account that passive immunotherapy against alpha-Syn has emerged as a very promising strategy for modifying PD and related synucleinopathies, conformation-specific antibodies may prove to be interesting tools for passive immunotherapy strategies. In this experiment a generated alpha-Syn oligomer specific antibody (26F1) has been selected based on its high-affinity and specific binding of alpha-Syn oligomers in tandem with much weaker binding affinity to alpha-Syn monomers and alpha-Syn fibrils.

One aim of this experiment was to develop protocols for immunohistochemical labelling of postmortem human brain tissue with a novel alpha-Syn oligomer-specific antibody and evaluate the affinity, localization and sensitivity for pathological structures in postmortem brain tissue samples of PD patients and age-matched non-neurological controls. Herein the immunoreactivity of 26F1 is reported detecting alpha-Syn species in selected paraffin-embedded and fresh frozen postmortem brain tissue of two controls and two advanced PD patients. The well-characterized alpha-Syn antibodies MJFR14 and 5G4 were used as references to locate the presence of alpha-Syn pathology in the adjacent sections (Kovacs et al., 2014 DOI 10.1016/j.nbd.2014.05.020; Lassen et al., 2018 DOI 10.1371/journal.pone.0196056).

Methods

For the performed IHC experiments, one PD case and one PD with dementia (PDD) case with extensive alpha-Syn pathology and two age-matched non-neurological controls were selected. Formalin-fixed paraffin-embedded 10-µm-thick consecutive sections of the substantia nigra (SN) and either cingulate cortex (CG) or hippocampus including entorhinal cortex (EC; only donor 4) were utilized. In addition, immunofluorescence experiments were performed on ten-µm-thick snap-frozen SN and CG sections of the same two PD(D) donors and controls. The pathological characteristics of the included donors are summarized in Table 2.

TABLE 2

Demographics and pathological information of the selected donors.

| Donor | Diagnosis | Sex | Age | Braak NFT | CERAD amyloid-β | Braak LB | PMD (hours) |
|---|---|---|---|---|---|---|---|
| 1 | PD | F | 71 | 1 | A | 6 | 7:55 |
| 2 | PDD | M | 80 | 1 | O | 6 | 5:25 |
| 3 | Non-neurological control | F | 84 | 1 | O | 0 | 4:45 |
| 4 | Non-neurological control | F | 60 | 0 | O | 0 | 8:10 |

CERAD = Consortium to Establish a Registry for Alzheimer's Disease;
F = female;
M = male;
NFT = neurofibrillary tangles;
PDD = Parkinson's disease dementia;
PMD = postmortem delay

TABLE 3

End concentrations and dilutions utilized for IHC.

| Antibody | Concentration (ng/ml) | Dilution |
|---|---|---|
| 26F1 | 1000 | 1:3500 |

The IHC protocol was without antigen retrieval. The concentrations of the 26F1 antibody is listed in Table 3. Protocols of both reference antibodies were based on previous studies (5G4, 1:5000; MJFR14, 1:80.000; Kovacs et al., 2014; Lassen et al., 2018). Immunoreactivity was visualized using 3,3'-diaminobenzidine (DAB) chromogen from the EnVision™+ kit (DAKO) as a high-sensitivity visualization system for all IHC experiments.

The immunolabelling with alpha-Syn antibodies in SN and either CG or entorhinal cortex was examined by means of light microscopy (Olympus BX45 and Leica DM5000 B photo microscope). In all brain sections, the detectability of the morphological structures has been assessed (see Table 4). The immunoreactivity of these structures was assessed per brain region within a diagnostic group (see Table 5).

Results

Morphological Structures Detected in the Postmortem Human Brain

Figure 4:
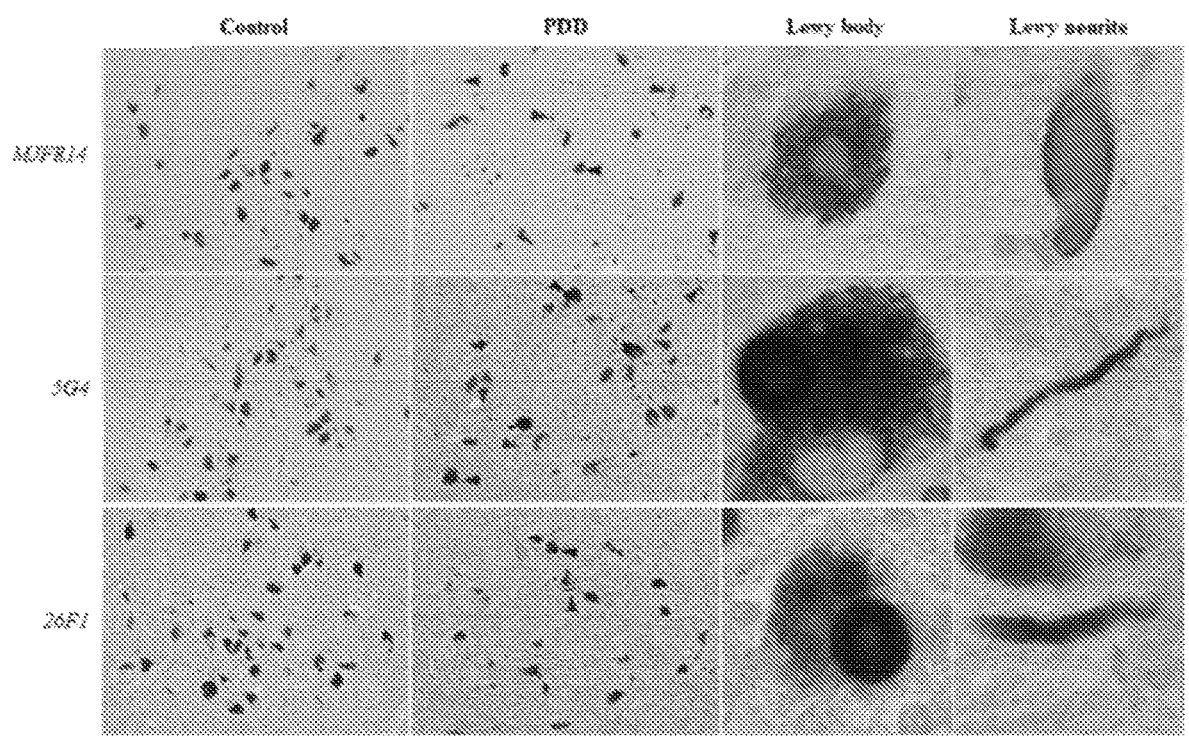
FIG. 4
A: Overview images of the substantia nigra of consecutive tissue sections from one brain donor per diagnostic group, immunostained with MJFR14, 5G4 and 26F1. Note the characteristic synaptic-like staining revealed by 26F1. The imaged brain tissue was obtained from a 84-year-old male non-neurological control donor and 71-year-old female Parkinson's disease with dementia (PDD) donor. Images in the two left columns were captured at 200× magnification and the scale bar represents a width of 250 µm. Arrowheads indicate Lewy bodies and/or Lewy neurites. For each antibody, one Lewy body and Lewy neurite are enlarged in the two right columns. These images were captured at 630× magnification and the scale bar represents a width of 10 µm.
B: Overview images of the cortex of consecutive tissue sections from one brain donor per diagnostic group, immunostained with MJFR14, 5G4 and 26F1. Note the characteristic synaptic-like staining revealed by 26F1. The imaged brain tissue was obtained from a 84-year-old male non-neurological control donor and 71-year-old female Parkinson's disease with dementia (PDD) donor. Images in the two left columns were captured at 200× magnification and the scale bar represents a width of 250 µm. Arrowheads indicate Lewy bodies. For each antibody, one Lewy body is enlarged in the right column. These images were captured at 630× magnification and the scale bar represents a width of 10 µm.
Figure 4:
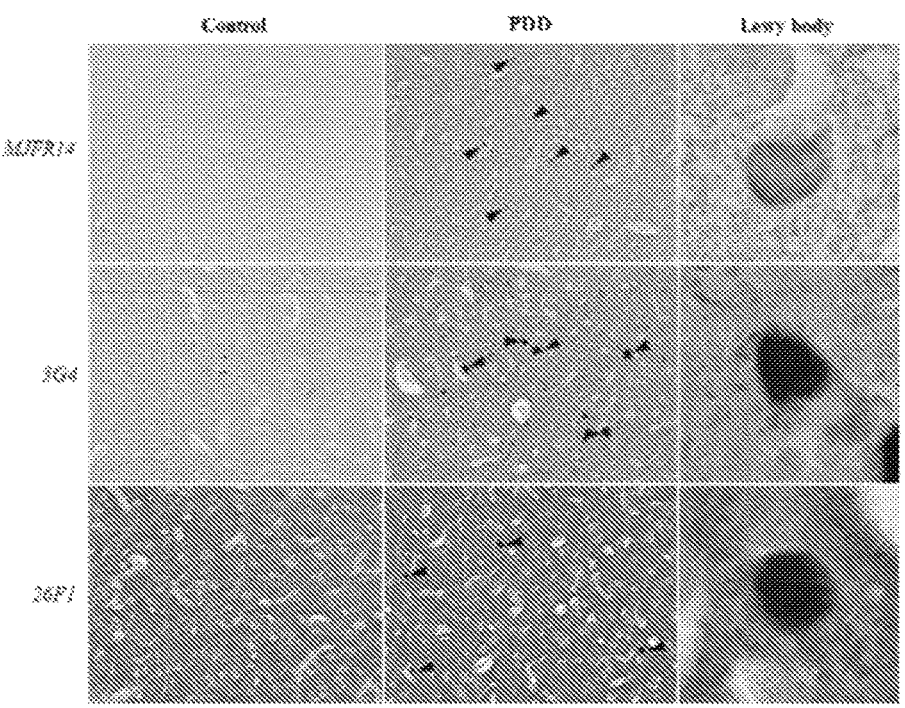

A wide variety of alpha-Syn-immunopositive morphological structures was detected in the SN and CG of the PD donors. We observed immunostaining with the alpha-Syn antibodies on both paraffin-embedded and fresh frozen brain tissue. The 26F1 antibody visualized LBs, thread-like and bulgy LNs, and some dot-like structures and glial cytoplasmic inclusions (GCIs). Interestingly, a laminar pattern was revealed within many of the compact or targetoid LBs and thread-like or bulgy LNs (FIG. 4A). Synaptic-like staining was more profound in the cortex of both controls and PD(D)s compared to SN. The 26F1 antibody did not reveal any staining in the white matter.

Reference antibody MJFR14 recognized LBs and small dot-like structures in both the SN and cortex of PD(D) cases (FIG. 4A and FIG. 4B). Thread-like LNs were occasionally observed. LBs and bulgy LNs in the SN presented with a targetoid appearance. Cortical LBs, and GCIs if present, were heterogeneously shaped and expanded throughout the entire neuronal or glial cytoplasm. For both non-neurological control and PD(D) cases a clear synaptic-like staining pattern was visible in the cortex. No other alpha-Syn morphological structures were present in the SN or cortex of controls.

The 5G4 antibody identified a wide variety of alpha-Syn immunopositive morphological structures (FIG. 4A and/or FIG. 4B). Compact LBs in the cortex and targetoid LBs in the SN were densely stained in PD(D) cases, and were found both intracellular and extracellular. In the SN, neuromelanin-containing neurons oftentimes contained granular cytoplasmic staining. Compared to non-neurological controls, in both the SN and cortex very short and thin LNs could be observed that were extensively surrounded by even smaller dot-like structures of a circular or more ellipse shape. Diffuse synaptic-like staining was only present in the cortex of both controls and PD(D) cases.

When comparing the 26F1 antibody with the references 5G4 and MJFR14, several resemblances as well as differences in the detection of morphological structures became apparent. Similar to the reference antibodies, 26F1 antibody was able to identify various configurations of LBs, ranging from compact dense forms to a more targetoid appearance, and LNs, including short and thin neurites as well as thick bulgy ones. Dot-like structures of different small sizes were also present in both reference and in 26F1 antibody. The 26F1 antibody identified a synaptic-like staining pattern in all tissue sections of all cases, whereas the reference antibodies only displayed this in the cortex. Characteristic for 26F1 was the diffuse and widespread immunostaining pattern throughout the SN and cortex of all cases, which was not present in 5G4 of MJFR14. The reference antibodies were able to detect glial immunopositivity, shaped like structures coiling around the nucleus and diffuse cytoplasmic staining. Few to none GCIs were present in the tissue sections stained by either 26F1 or reference antibodies. The striped lamination pattern visualized in various LBs and LNs is uniquely detected by the 26F1 antibody.

Discussion

Main Results

Synaptic-like staining labeled with 26F1 in all cases.
26F1: interesting laminar pattern in many compact/targetoid LBs and threads/bulgy LNs & dot-like structures and GCIs observed in PD(D).

MJFR14: LBs, thread-like LNs, dot-like structures in PD(D). Targetoid LBs and bulgy LNs in SN. Synaptic-like staining in all cases.

5G4: wide variety of morphology. Densely stained LBs in cortex and targetoid LBs in SN of PD(D). Dot-like and short/thin LNs in both regions in PD(D).

This experiment describes the immunoreactivity in PD(D) donors as compared to non-neurological controls of a novel alpha-Syn antibody. A significant aspect in the development of alpha-synucleinopathies is the conversion of soluble alpha-Syn monomers to soluble oligomeric forms. The 26F1 antibody recognized the oligomer-specific alpha-Syn species that serves as a disease-specific modification of alpha-Syn. 26F1 antibody, or antigen-binding portions thereof, therefore potentially can be good candidate markers of this disease.

The qualitative and semi-quantitative results regarding specificity in detecting the well-described and main hallmark alpha-Syn morphological structures vary between the antibodies. The 26F1 antibody overall displays more diverse structures, and might therefore be of primary use in differentiating different alpha-Syn morphologies (against full length alpha-Syn) in identifying synucleinopathy diseases via immunohistochemical application. This antibody furthermore detects synaptic-like staining that is present in PD(D) cases as well as non-neurological controls. Normally, alpha-Syn is localized at presynaptic terminals where it is suggested to be associated with synaptic vesicle regulations (Lashuel et al., 2013 DOI 10.1038/nrn3406.). Since this synaptic-like staining was also present in non-diseased subjects, this might be indicative of labeled physiological forms of alpha-Syn.

A unique feature for the 26F1 antibody is the striped laminar pattern that could be observed in LBs and LNs. Reference 5G4 is directed against N-terminal alpha-Syn (amino acids 46-53; Kovacs et al., 2014), and although reference MJFR14 likewise has a high affinity for oligomeric alpha-Syn (Lassen et al., 2018), this is suggestive of another epitope recognized by 26F1 compared to both reference antibodies.

TABLE 4

Definitions of the main morphological structures that were assessed.

| Structure | Location | Shape | Size |
| --- | --- | --- | --- |
| Lewy body | GM, extraneuronal | Either targetoid (predominant in midbrain) or compact (predominant in hippocampus and deep cortical layers) | Diameter: 6-25 μm |
| | GM, intraneuronal | Either targetoid (predominant in midbrain) or compact (predominant in hippocampus) | Diameter: 6-25 μm |
| Thread-like Lewy neurite | GM, neuronal processes | Line shaped, (might not always appear homogeneous or as a single structure along its length = a set of aligned small thin neurites) | Length: >15 μm Width: <2 μm |
| Bulgy Lewy neurite | GM, neuronal processes | Compared to thread-like LNs, these are closer to ropes in shape, often darkly stained and the structure may have a targetoid appearance | Length: >15 μm Width: >2-3 μm |
| Dot-like structure | GM, extracellular | Compact dot, homogeneously DAB positive | Diameter: >1-6 μm |
| Small thin neurite | GM, neuronal or glial processes | Line shaped, dependent on where the cut through the section has been made | Length: <15 μm Width: <2 μm |
| Ring-shaped glial cytoplasmic inclusion | GM/WM, glial cell | Worm-like structure entirety or partly coiled around the nucleus of a glial cell | Diameter: 5-15 μm |
| Papp-Lantos body | GM/WM, glial cell | Flame-shaped or conical inclusion within glial cell | Diameter: 5-13 μm |
| Diffusely stained astrocyte | GM/WM, glial cell | Spider-like structure with dense core, merely clusters of alpha-Syn immunopositive astrocytic processes | Diameter: ~40 μm |
| Alpha-Syn immunopositive glial extensions radiating around nucleus | GM/WM, glial cell | Sun-like structure; an unstained glial nucleus surrounded by radially positioned small thin neurite-like structures | Diameter: <20-30 μm |
| Synaptic-like staining | GM, along neuronal processes | Tiny speckles or boutons | Diameter: <2 μm |

GM, grey matter;
WM, white matter

TABLE 5

Scoring table used for semi-quantitative assessment of the main morphological structures.

| Structure | – = 1 | + = 2 | ++ = 3 | +++ = 4 |
|---|---|---|---|---|
| Lewy body | Not detected | 2 or less | 2-5 | >5 |
| Thread-like Lewy neurite | Not detected | Few | Moderate | Numerous |
| Bulgy Lewy neurite | Not detected | 2 or less | 2-7 | >7 |
| Dot-like & small structures (including small thin neurites) | Not detected | Few | Moderate | Numerous |
| Glial cytoplasmic inclusion | Not detected | 5 or less | 5-10 | Numerous |
| Synaptic-like staining | Not detected | Light | Moderate | Dark |

Example 5—Antibody Stability Study

The following protocol applies to the stability of the antibodies, or antigen-binding portions thereof, of present invention. Stability of the antibody was determined using ELISA.

Figure 5:
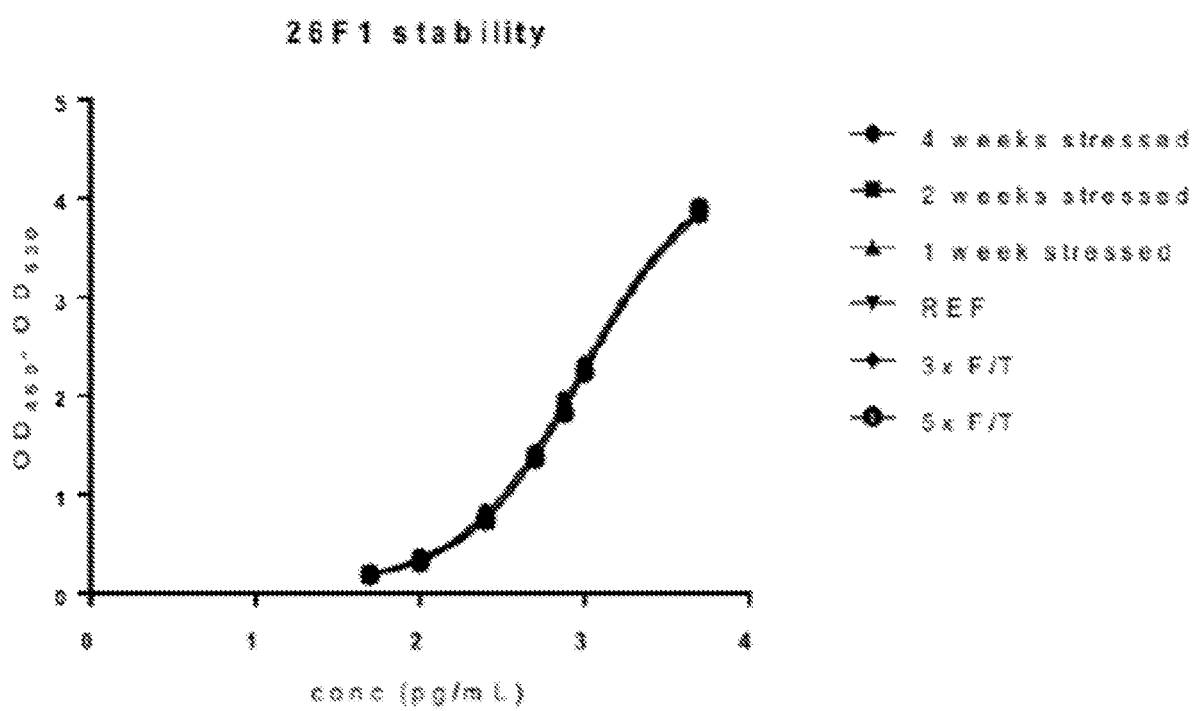
FIG. 5 shows the stability of various concentrations of 26F1 in solution. Stability was analyzed by ELISA. The solutions of 26F1 antibody were stressed for 4 weeks, 2 weeks of 1 week and/or were frozen and thawed 3× or 5×
Figure 6:
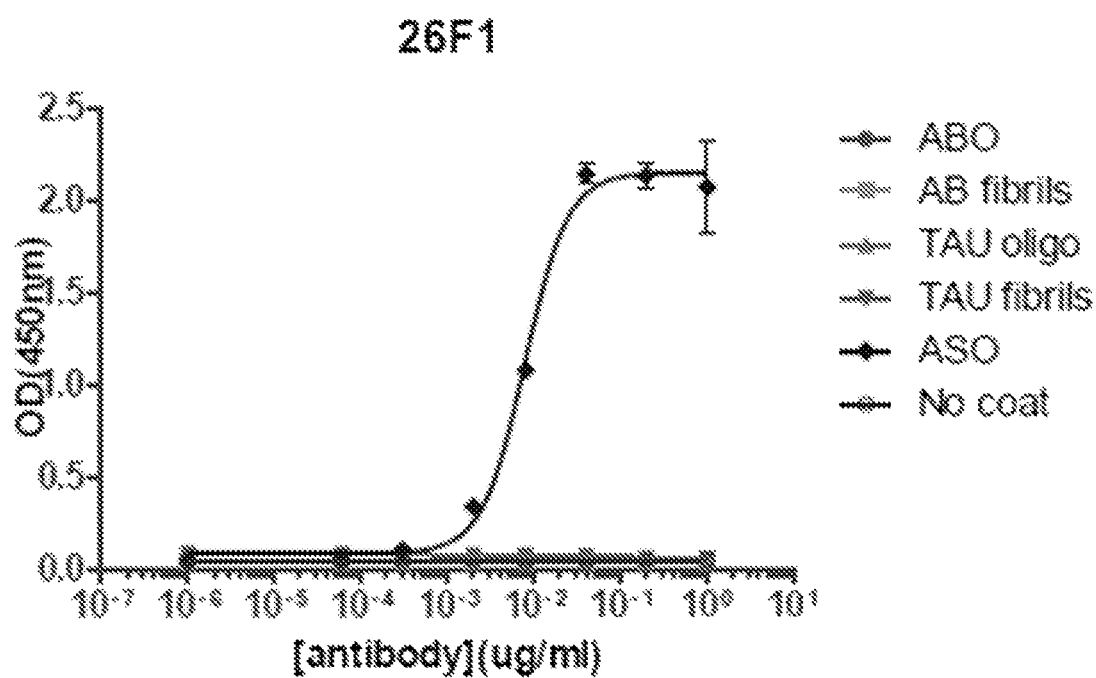
FIG. 6
A: depicts the specificity of 26F1 for ASO (alpha-synuclein oligomers), compared to ABO (alpha-beta oligomers), AB fibrils (alpha-beta fibrils), TAU oligo (tau oligomers), TAU fibrils (tau fibrils).
B.

The antibody 26F1 was kept for at least four weeks at 37 degrees Celsius and was subjected to three or five freeze/thawing (F/T) cycles. Overall, the antibody in solution remains stable and binding properties remain the same over time and/or under influence of by F/T cycles (see FIG. 5).

Example 6—Reactivity of Antigen-Binding Portions (Antibody Fragments)

Figure 8:
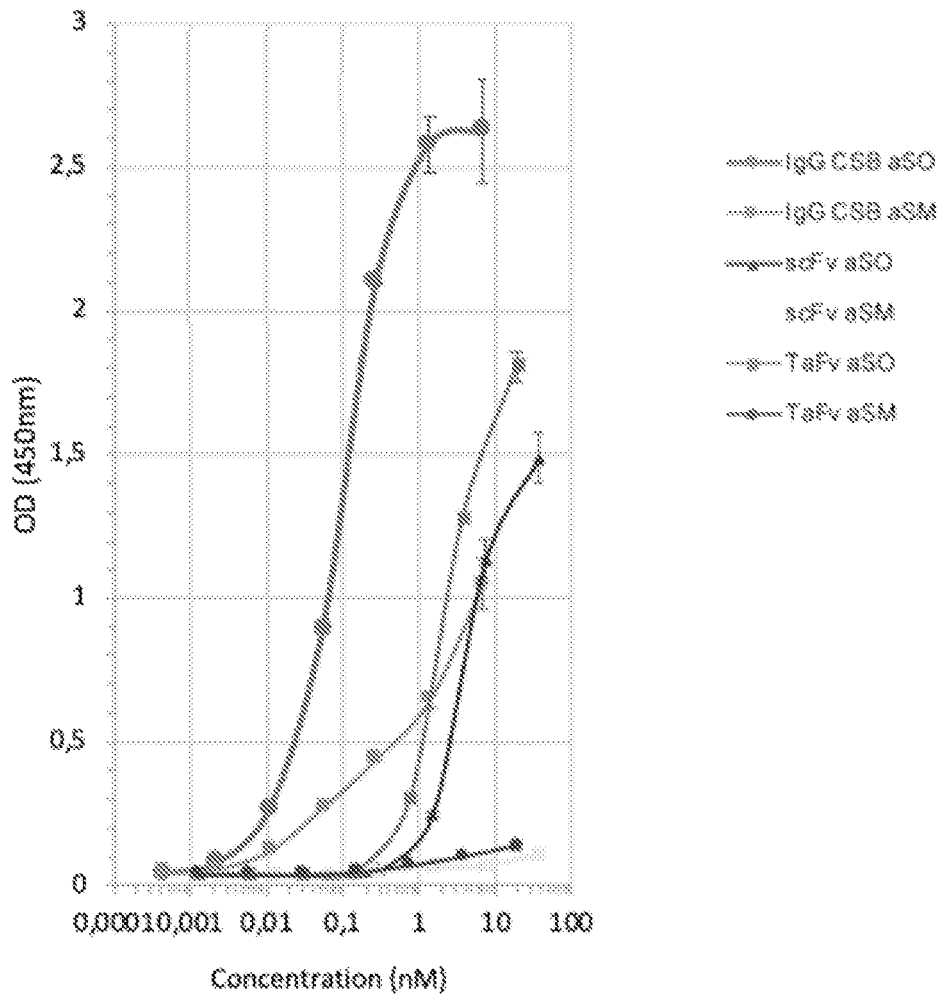
FIG. 8 depicts the reactivity of purified antibody fragments 26F1 scFv and 26F1 TaFv to alpha-Syn oligomers and alpha-Syn monomers as determined by ELISA in nM at different concentrations.

Antibody fragments were produced by transfection- and purification-methods known to the skilled person. Purified antibody fragments 26F1 scFv (single-chain variable fragment) and 26F1 TaFv (tandem single-chain variable fragment) were tested on reactivity to alpha-Syn oligomers and alpha-Syn monomers. FIG. 8 displays the reactivity of the antibody fragments. Further in FIG. 8 IgG 26F1 is used as a positive control.

In FIG. 8C scFv and TaFv reacted similarly on alpha-Syn oligomer and similarly only slightly on alpha-Syn monomer. The EC50 of scFv on alpha-Syn oligomer is about 3.7 nM and the EC50 of TaFv on alpha-Syn oligomer is about 2.0 nM. The exact ratio of monomers (ND) could not be calculated because saturation could not be reached. According to the graph the specificity ratio of alpha-Syn oligomer compared to alpha-Syn monomer is at least a factor 100. In other words, specificity of scFV and/or TaFv to alpha-Syn oligomer is about 100 times higher than for alpha-Syn monomer.

Used Sequences

Below is an overview of the sequences used herein:

| SEQ ID NO: | DNA/Prot | Description |
|---|---|---|
| 1 | nucleic acid | Heavy chain variable region |
| 2 | nucleic acid | Light chain variable region |
| 3 | amino acid | Heavy chain variable region |
| 4 | amino acid | Light chain variable region |
| 5 | nucleic acid | Heavy chain CDR1 |
| 6 | nucleic acid | Heavy chain CDR2 |
| 7 | nucleic acid | Heavy chain CDR3 |
| 8 | nucleic acid | Light chain CDR1 |
| 9 | nucleic acid | Light chain CDR2 |
| 10 | nucleic acid | Light chain CDR3 |
| 11 | amino acid | Heavy chain CDR1 |
| 12 | amino acid | Heavy chain CDR2 |
| 13 | amino acid | Heavy chain CDR3 |
| 14 | amino acid | Light chain CDR1 |
| 15 | amino acid | Light chain CDR2 |
| 16 | amino acid | Light chain CDR3 |
| 17 | nucleic acid | Heavy chain signal peptide |
| 18 | nucleic acid | Light chain signal peptide |
| 19 | amino acid | Heavy chain signal peptide |
| 20 | amino acid | Light chain signal peptide |
| 21 | nucleic acid | Heavy chain variable region with signal peptide |
| 22 | nucleic acid | Light chain variable region with signal peptide |
| 23 | amino acid | Heavy chain variable region with signal peptide |
| 24 | amino acid | Light chain variable region with signal peptide |
| 25 | amino acid | ScFv |
| 26 | amino acid | TaFv |
| 27 | amino acid | 1x Glycine linker |
| 28 | amino acid | 2x Glycine linker |
| 29 | amino acid | 3x Glycine linker |
| 30 | amino acid | Full heavy chain |
| 31 | amino acid | Full light chain |
| 32 | amino acid | linker His tag |

The invention claimed is:

1. An isolated antibody, or antigen-binding portion thereof, said antibody, or antigen-binding portion thereof, comprises a heavy chain variable region comprising:
   a) a heavy chain CDR1 comprising the amino acid sequence of SEQ ID NO: 11;
   b) a heavy chain CDR2 comprising the amino acid sequence of SEQ ID NO: 12; and
   c) a heavy chain CDR3 comprising the amino acid sequence of SEQ ID NO: 13; and comprises a light chain variable region comprising:
   d) a light chain CDR1 comprising the amino acid sequence of SEQ ID NO: 14;
   e) a light chain CDR2 comprising the amino acid sequence of SEQ ID NO: 15; and
   f) a light chain CDR3 comprising the amino acid sequence of SEQ ID NO: 16.

2. The isolated antibody, or antigen-binding portion thereof, according to claim 1, said antibody comprising a heavy chain variable region encoded by the nucleic acid sequence of SEQ ID NO: 1 and a light chain variable region encoded by the nucleic acid sequence of SEQ ID NO: 2.

3. The isolated antibody, or antigen-binding portion thereof, according to claim 1, wherein said antibody, or antigen-binding portion thereof, binds an epitope of alpha-synuclein oligomer.

4. The isolated antibody according to claim 1, wherein said antibody comprises an IgG isotype selected from IgG2a isotype or an IgG2a kappa isotype.

5. A nucleic acid comprising a polynucleotide sequence encoding the antibody, or antigen-binding portion thereof, according to claim 1.

6. The nucleic acid according to claim 5 comprising a polynucleotide sequence encoding the amino acid sequence of SEQ ID NO: 3, and a polynucleotide sequence encoding the amino acid sequence of SEQ ID NO: 4.

7. The nucleic acid according to claim 5, wherein said nucleic acid comprises:
   a) a heavy chain CDR1 comprising the nucleic acid of SEQ ID NO: 5;
   b) a heavy chain CDR2 comprising the nucleic acid of SEQ ID NO: 6; and
   c) a heavy chain CDR3 comprising the nucleic acid of SEQ ID NO: 7; and
   d) a light chain CDR1 comprising the nucleic acid of SEQ ID NO: 8;
   e) a light chain CDR2 comprising the nucleic acid of SEQ ID NO: 9; and
   f) a light chain CDR3 comprising the nucleic acid of SEQ ID NO: 10.

8. The nucleic acid according to claim 5, said nucleic acid comprising SEQ ID NO: 1 and SEQ ID NO: 2.

9. The isolated antibody, or antigen-binding portion thereof, according to claim 1, wherein the antibody binds alpha-Syn oligomers with a binding affinity of 150 pM or less, wherein the antibody has a higher binding preference for an alpha-Synuclein oligomers compared to alpha-Synuclein fibrils and compared to alpha-Synuclein monomers, and wherein the ratio of the binding affinity for alpha-Synuclein oligomers: alpha-Synuclein fibrils is at least 20.

10. A method for producing an antibody, or antigen-binding portion thereof, wherein the method comprises cultivating a host cell comprising the nucleic acid according to claim 5 and obtaining the antibody, or antigen binding portion thereof, encoded by said nucleic acid or an expression vector or a viral vector.

11. The antibody, or antigen-binding portion thereof, according to claim 1 for use as a medicament.

* * * * *

SEQUENCE LISTING

```
<160> NUMBER OF SEQ ID NOS: 32

<210> SEQ ID NO 1
<211> LENGTH: 339
<212> TYPE: DNA
<213> ORGANISM: Artificial Sequence
<220> FEATURE:
<223> OTHER INFORMATION: Synthetic Construct

<400> SEQUENCE: 1
gatgtgcagc ttcaggagtc gggacctggc ctggtgaaac cttctcagtc tctgtccctc      60
acctgcactg tcactggcta ctcaatcacc agtgattatg cctggaactg gatccggcag     120
tttccaggaa acaagctgga gtggttgggc tacataagct acagtggtaa cacttactac     180
aacccatctc tcaaagtcg aatctctatc actcgagaca catccaagaa ccagttcttc     240
ctgcatttga attctgtgac tactgaggac acagccacat attactgtgc gggtaactac     300
```

```
gttcgctggg gccaagggac tctggtcact gtctctgca                            339
```

<210> SEQ ID NO 2
<211> LENGTH: 336
<212> TYPE: DNA
<213> ORGANISM: Artificial Sequence
<220> FEATURE:
<223> OTHER INFORMATION: Synthetic Construct

<400> SEQUENCE: 2

```
gatgttgtga tgacccagac tccactcact ttgtcggtta ccattggaca accagcttcc     60
atctcttgca gtcaagtca gagcctctta tatactaatg aaaaaccta tttgaattgg      120
ttattacaga ggccaggcca gtctccaaaa cgcctaatct atctggtgtc taaattggac   180
tctggagtcc ctgacaggtt cagtggcagt ggatcaggga cagatttcac actgaaaatc   240
agcagagtgg aggctgagga tttgggagtt tattactgct tgcagagttc acattttcct   300
cacacgttcg gctcggggac aaagttggaa ataaaa                              336
```

<210> SEQ ID NO 3
<211> LENGTH: 113
<212> TYPE: PRT
<213> ORGANISM: Artificial Sequence
<220> FEATURE:
<223> OTHER INFORMATION: Synthetic Construct

<400> SEQUENCE: 3

```
Asp Val Gln Leu Gln Glu Ser Gly Pro Gly Leu Val Lys Pro Ser Gln
1               5                   10                  15
Ser Leu Ser Leu Thr Cys Thr Val Thr Gly Tyr Ser Ile Thr Ser Asp
            20                  25                  30
Tyr Ala Trp Asn Trp Ile Arg Gln Phe Pro Gly Asn Lys Leu Glu Trp
        35                  40                  45
Leu Gly Tyr Ile Ser Tyr Ser Gly Asn Thr Tyr Tyr Asn Pro Ser Leu
    50                  55                  60
Lys Ser Arg Ile Ser Ile Thr Arg Asp Thr Ser Lys Asn Gln Phe Phe
65                  70                  75                  80
Leu His Leu Asn Ser Val Thr Thr Glu Asp Thr Ala Thr Tyr Tyr Cys
                85                  90                  95
Ala Gly Asn Tyr Val Arg Trp Gly Gln Gly Thr Leu Val Thr Val Ser
            100                 105                 110
Ala
```

<210> SEQ ID NO 4
<211> LENGTH: 112
<212> TYPE: PRT
<213> ORGANISM: Artificial Sequence
<220> FEATURE:
<223> OTHER INFORMATION: Synthetic Construct

<400> SEQUENCE: 4

```
Asp Val Val Met Thr Gln Thr Pro Leu Thr Leu Ser Val Thr Ile Gly
1               5                   10                  15
Gln Pro Ala Ser Ile Ser Cys Lys Ser Ser Gln Ser Leu Leu Tyr Thr
            20                  25                  30
Asn Gly Lys Thr Tyr Leu Asn Trp Leu Leu Gln Arg Pro Gly Gln Ser
        35                  40                  45
Pro Lys Arg Leu Ile Tyr Leu Val Ser Lys Leu Asp Ser Gly Val Pro
    50                  55                  60
```

```
Asp Arg Phe Ser Gly Ser Gly Ser Gly Thr Asp Phe Thr Leu Lys Ile
 65                  70                  75                  80

Ser Arg Val Glu Ala Glu Asp Leu Gly Val Tyr Tyr Cys Leu Gln Ser
                 85                  90                  95

Ser His Phe Pro His Thr Phe Gly Ser Gly Thr Lys Leu Glu Ile Lys
            100                 105                 110
```

<210> SEQ ID NO 5
<211> LENGTH: 18
<212> TYPE: DNA
<213> ORGANISM: Artificial Sequence
<220> FEATURE:
<223> OTHER INFORMATION: Synthetic Construct

<400> SEQUENCE: 5
agtgattatg cctggaac                                              18

<210> SEQ ID NO 6
<211> LENGTH: 48
<212> TYPE: DNA
<213> ORGANISM: Artificial Sequence
<220> FEATURE:
<223> OTHER INFORMATION: Synthetic Construct

<400> SEQUENCE: 6
tacataagct acagtggtaa cacttactac aacccatctc tcaaaagt              48

<210> SEQ ID NO 7
<211> LENGTH: 12
<212> TYPE: DNA
<213> ORGANISM: Artificial Sequence
<220> FEATURE:
<223> OTHER INFORMATION: Synthetic Construct

<400> SEQUENCE: 7
aactacgttc gc                                                    12

<210> SEQ ID NO 8
<211> LENGTH: 48
<212> TYPE: DNA
<213> ORGANISM: Artificial Sequence
<220> FEATURE:
<223> OTHER INFORMATION: Synthetic Construct

<400> SEQUENCE: 8
aagtcaagtc agagcctctt atatactaat ggaaaaacct atttgaat              48

<210> SEQ ID NO 9
<211> LENGTH: 21
<212> TYPE: DNA
<213> ORGANISM: Artificial Sequence
<220> FEATURE:
<223> OTHER INFORMATION: Synthetic Construct

<400> SEQUENCE: 9
ctggtgtcta aattggactc t                                          21

<210> SEQ ID NO 10
<211> LENGTH: 27
<212> TYPE: DNA
<213> ORGANISM: Artificial Sequence
<220> FEATURE:
<223> OTHER INFORMATION: Synthetic Construct

<400> SEQUENCE: 10
ttgcagagtt cacattttcc tcacacg                                    27

<210> SEQ ID NO 11
<211> LENGTH: 6
<212> TYPE: PRT
<213> ORGANISM: Artificial Sequence
<220> FEATURE:
<223> OTHER INFORMATION: Synthetic Construct

<400> SEQUENCE: 11

Ser Asp Tyr Ala Trp Asn
1               5

<210> SEQ ID NO 12
<211> LENGTH: 16
<212> TYPE: PRT
<213> ORGANISM: Artificial Sequence
<220> FEATURE:
<223> OTHER INFORMATION: Synthetic Construct

<400> SEQUENCE: 12

Tyr Ile Ser Tyr Ser Gly Asn Thr Tyr Tyr Asn Pro Ser Leu Lys Ser
1               5                   10                  15

<210> SEQ ID NO 13
<211> LENGTH: 4
<212> TYPE: PRT
<213> ORGANISM: Artificial Sequence
<220> FEATURE:
<223> OTHER INFORMATION: Synthetic Construct

<400> SEQUENCE: 13

Asn Tyr Val Arg
1

<210> SEQ ID NO 14
<211> LENGTH: 16
<212> TYPE: PRT
<213> ORGANISM: Artificial Sequence
<220> FEATURE:
<223> OTHER INFORMATION: Synthetic Construct

<400> SEQUENCE: 14

Lys Ser Ser Gln Ser Leu Leu Tyr Thr Asn Gly Lys Thr Tyr Leu Asn
1               5                   10                  15

<210> SEQ ID NO 15
<211> LENGTH: 7
<212> TYPE: PRT
<213> ORGANISM: Artificial Sequence
<220> FEATURE:
<223> OTHER INFORMATION: Synthetic Construct

<400> SEQUENCE: 15

Leu Val Ser Lys Leu Asp Ser
1               5

<210> SEQ ID NO 16
<211> LENGTH: 9
<212> TYPE: PRT
<213> ORGANISM: Artificial Sequence
<220> FEATURE:
<223> OTHER INFORMATION: Synthetic Construct

<400> SEQUENCE: 16

Leu Gln Ser Ser His Phe Pro His Thr

<210> SEQ ID NO 17
<211> LENGTH: 54
<212> TYPE: DNA
<213> ORGANISM: Artificial Sequence
<220> FEATURE:
<223> OTHER INFORMATION: Synthetic Construct

<400> SEQUENCE: 17
atgagagtgc tgattctttt gtggctgttc acagcctttc ctggtatcct gtct    54

<210> SEQ ID NO 18
<211> LENGTH: 57
<212> TYPE: DNA
<213> ORGANISM: Artificial Sequence
<220> FEATURE:
<223> OTHER INFORMATION: Synthetic Construct

<400> SEQUENCE: 18
atgagtcctg cccagttcct gtttctgcta gtgctctcga ttcaggatat caacggt    57

<210> SEQ ID NO 19
<211> LENGTH: 18
<212> TYPE: PRT
<213> ORGANISM: Artificial Sequence
<220> FEATURE:
<223> OTHER INFORMATION: Synthetic Construct

<400> SEQUENCE: 19

Met Arg Val Leu Ile Leu Leu Trp Leu Phe Thr Ala Phe Pro Gly Ile
1               5                   10                  15

Leu Ser

<210> SEQ ID NO 20
<211> LENGTH: 19
<212> TYPE: PRT
<213> ORGANISM: Artificial Sequence
<220> FEATURE:
<223> OTHER INFORMATION: Synthetic Construct

<400> SEQUENCE: 20

Met Ser Pro Ala Gln Phe Leu Phe Leu Leu Val Leu Ser Ile Gln Asp
1               5                   10                  15

Ile Asn Gly

<210> SEQ ID NO 21
<211> LENGTH: 393
<212> TYPE: DNA
<213> ORGANISM: Artificial Sequence
<220> FEATURE:
<223> OTHER INFORMATION: Synthetic Construct

<400> SEQUENCE: 21
atgagagtgc tgattctttt gtggctgttc acagcctttc ctggtatcct gtctgatgtg    60
cagcttcagg agtcgggacc tggcctggtg aaaccttctc agtctctgtc cctcacctgc   120
actgtcactg ctactcaat caccagtgat tatgcctgga ctggatccg gcagtttcca   180 ggaaacaagc tggagtggtt gggctacata agctacagtg taacactta ctacaaccca   240 tctctcaaaa gtcgaatctc tatcactcga gacacatcca agaaccagtt cttcctgcat   300
ttgaattctg tgactactga ggacacagcc acatattact gtgcgggtaa ctacgttcgc   360
tggggccaag ggactctggt cactgtctct gca    393

<210> SEQ ID NO 22
<211> LENGTH: 393
<212> TYPE: DNA
<213> ORGANISM: Artificial Sequence
<220> FEATURE:
<223> OTHER INFORMATION: Synthetic Construct

<400> SEQUENCE: 22

```
atgagtcctg cccagttcct gtttctgcta gtgctctcga ttcaggatat caacggtgat    60
gttgtgatga cccagactcc actcactttg tcggttacca ttggacaacc agcttccatc   120
tcttgcaagt caagtcagag cctcttatat actaatggaa aaacctattt gaattggtta   180
ttacagaggc caggccagtc tccaaaacgc ctaatctatc tggtgtctaa attggactct   240
ggagtccctg acaggttcag tgcagtggat caggacagat ttcacactga aaatcagc     300
agagtggagg ctgaggattt gggagtttat tactgcttgc agagttcaca ttttcctcac   360
acgttcggct cggggacaaa gttggaaata aaa                                 393
```

<210> SEQ ID NO 23
<211> LENGTH: 131
<212> TYPE: PRT
<213> ORGANISM: Artificial Sequence
<220> FEATURE:
<223> OTHER INFORMATION: Synthetic Construct

<400> SEQUENCE: 23

```
Met Arg Val Leu Ile Leu Leu Trp Leu Phe Thr Ala Phe Pro Gly Ile
1               5                  10                  15
Leu Ser Asp Val Gln Leu Gln Glu Ser Gly Pro Gly Leu Val Lys Pro
            20                  25                  30
Ser Gln Ser Leu Ser Leu Thr Cys Thr Val Thr Gly Tyr Ser Ile Thr
        35                  40                  45
Ser Asp Tyr Ala Trp Asn Trp Ile Arg Gln Phe Pro Gly Asn Lys Leu
    50                  55                  60
Glu Trp Leu Gly Tyr Ile Ser Tyr Ser Gly Asn Thr Tyr Tyr Asn Pro
65                  70                  75                  80
Ser Leu Lys Ser Arg Ile Ser Ile Thr Arg Asp Thr Ser Lys Asn Gln
                85                  90                  95
Phe Phe Leu His Leu Asn Ser Val Thr Thr Glu Asp Thr Ala Thr Tyr
            100                 105                 110
Tyr Cys Ala Gly Asn Tyr Val Arg Trp Gly Gln Gly Thr Leu Val Thr
        115                 120                 125
Val Ser Ala
    130
```

<210> SEQ ID NO 24
<211> LENGTH: 131
<212> TYPE: PRT
<213> ORGANISM: Artificial Sequence
<220> FEATURE:
<223> OTHER INFORMATION: Synthetic Construct

<400> SEQUENCE: 24

```
Met Ser Pro Ala Gln Phe Leu Phe Leu Leu Val Leu Ser Ile Gln Asp
1               5                  10                  15
Ile Asn Gly Asp Val Val Met Thr Gln Thr Pro Leu Thr Leu Ser Val
            20                  25                  30
Thr Ile Gly Gln Pro Ala Ser Ile Ser Cys Lys Ser Ser Gln Ser Leu
```

35                  40                  45
Leu Tyr Thr Asn Gly Lys Thr Tyr Leu Asn Trp Leu Leu Gln Arg Pro
 50                  55                  60

Gly Gln Ser Pro Lys Arg Leu Ile Tyr Leu Val Ser Lys Leu Asp Ser
 65                  70                  75                  80

Gly Val Pro Asp Arg Phe Ser Gly Ser Gly Ser Gly Thr Asp Phe Thr
                     85                  90                  95

Leu Lys Ile Ser Arg Val Glu Ala Glu Asp Leu Gly Val Tyr Tyr Cys
                    100                 105                 110

Leu Gln Ser Ser His Phe Pro His Thr Phe Gly Ser Gly Thr Lys Leu
                    115                 120                 125

Glu Ile Lys
            130

<210> SEQ ID NO 25
<211> LENGTH: 240
<212> TYPE: PRT
<213> ORGANISM: Artificial Sequence
<220> FEATURE:
<223> OTHER INFORMATION: Recombinant sequence

<400> SEQUENCE: 25

Asp Val Gln Leu Gln Glu Ser Gly Pro Gly Leu Val Lys Pro Ser Gln
 1               5                  10                  15

Ser Leu Ser Leu Thr Cys Thr Val Thr Gly Tyr Ser Ile Thr Ser Asp
                 20                  25                  30

Tyr Ala Trp Asn Trp Ile Arg Gln Phe Pro Gly Asn Lys Leu Glu Trp
             35                  40                  45

Leu Gly Tyr Ile Ser Tyr Ser Gly Asn Thr Tyr Tyr Asn Pro Ser Leu
 50                  55                  60

Lys Ser Arg Ile Ser Ile Thr Arg Asp Thr Ser Lys Asn Gln Phe Phe
 65                  70                  75                  80

Leu His Leu Asn Ser Val Thr Thr Glu Asp Thr Ala Thr Tyr Tyr Cys
                 85                  90                  95

Ala Gly Asn Tyr Val Arg Trp Gly Gln Gly Thr Leu Val Thr Val Ser
                100                 105                 110

Ala Gly Gly Gly Ser Gly Gly Gly Gly Ser Gly Gly Gly Gly Ser
                115                 120                 125

Asp Val Val Met Thr Gln Thr Pro Leu Thr Leu Ser Val Thr Ile Gly
            130                 135                 140

Gln Pro Ala Ser Ile Ser Cys Lys Ser Ser Gln Ser Leu Leu Tyr Thr
145                 150                 155                 160

Asn Gly Lys Thr Tyr Leu Asn Trp Leu Leu Gln Arg Pro Gly Gln Ser
                165                 170                 175

Pro Lys Arg Leu Ile Tyr Leu Val Ser Lys Leu Asp Ser Gly Val Pro
                180                 185                 190

Asp Arg Phe Ser Gly Ser Gly Ser Gly Thr Asp Phe Thr Leu Lys Ile
                195                 200                 205

Ser Arg Val Glu Ala Glu Asp Leu Gly Val Tyr Tyr Cys Leu Gln Ser
                210                 215                 220

Ser His Phe Pro His Thr Phe Gly Ser Gly Thr Lys Leu Glu Ile Lys
225                 230                 235                 240

<210> SEQ ID NO 26
<211> LENGTH: 485
<212> TYPE: PRT

<213> ORGANISM: Artificial Sequence
<220> FEATURE:
<223> OTHER INFORMATION: Recombinant sequence

<400> SEQUENCE: 26

```
Asp Val Gln Leu Gln Glu Ser Gly Pro Gly Leu Val Lys Pro Ser Gln
1               5                   10                  15

Ser Leu Ser Leu Thr Cys Thr Val Thr Gly Tyr Ser Ile Thr Ser Asp
            20                  25                  30

Tyr Ala Trp Asn Trp Ile Arg Gln Phe Pro Gly Asn Lys Leu Glu Trp
        35                  40                  45

Leu Gly Tyr Ile Ser Tyr Ser Gly Asn Thr Tyr Tyr Asn Pro Ser Leu
    50                  55                  60

Lys Ser Arg Ile Ser Ile Thr Arg Asp Thr Ser Lys Asn Gln Phe Phe
65                  70                  75                  80

Leu His Leu Asn Ser Val Thr Thr Glu Asp Thr Ala Thr Tyr Tyr Cys
                85                  90                  95

Ala Gly Asn Tyr Val Arg Trp Gly Gln Gly Thr Leu Val Thr Val Ser
            100                 105                 110

Ala Gly Gly Gly Gly Ser Gly Gly Gly Gly Ser Gly Gly Gly Gly Ser
        115                 120                 125

Asp Val Val Met Thr Gln Thr Pro Leu Thr Leu Ser Val Thr Ile Gly
    130                 135                 140

Gln Pro Ala Ser Ile Ser Cys Lys Ser Ser Gln Ser Leu Leu Tyr Thr
145                 150                 155                 160

Asn Gly Lys Thr Tyr Leu Asn Trp Leu Leu Gln Arg Pro Gly Gln Ser
                165                 170                 175

Pro Lys Arg Leu Ile Tyr Leu Val Ser Lys Leu Asp Ser Gly Val Pro
            180                 185                 190

Asp Arg Phe Ser Gly Ser Gly Ser Gly Thr Asp Phe Thr Leu Lys Ile
        195                 200                 205

Ser Arg Val Glu Ala Glu Asp Leu Gly Val Tyr Tyr Cys Leu Gln Ser
    210                 215                 220

Ser His Phe Pro His Thr Phe Gly Ser Gly Thr Lys Leu Glu Ile Lys
225                 230                 235                 240

Gly Gly Gly Gly Ser Asp Val Gln Leu Gln Glu Ser Gly Pro Gly Leu
                245                 250                 255

Val Lys Pro Ser Gln Ser Leu Ser Leu Thr Cys Thr Val Thr Gly Tyr
            260                 265                 270

Ser Ile Thr Ser Asp Tyr Ala Trp Asn Trp Ile Arg Gln Phe Pro Gly
        275                 280                 285

Asn Lys Leu Glu Trp Leu Gly Tyr Ile Ser Tyr Ser Gly Asn Thr Tyr
    290                 295                 300

Tyr Asn Pro Ser Leu Lys Ser Arg Ile Ser Ile Thr Arg Asp Thr Ser
305                 310                 315                 320

Lys Asn Gln Phe Phe Leu His Leu Asn Ser Val Thr Thr Glu Asp Thr
                325                 330                 335

Ala Thr Tyr Tyr Cys Ala Gly Asn Tyr Val Arg Trp Gly Gln Gly Thr
            340                 345                 350

Leu Val Thr Val Ser Ala Gly Gly Gly Gly Ser Gly Gly Gly Gly Ser
        355                 360                 365

Gly Gly Gly Gly Ser Asp Val Val Met Thr Gln Thr Pro Leu Thr Leu
    370                 375                 380

Ser Val Thr Ile Gly Gln Pro Ala Ser Ile Ser Cys Lys Ser Ser Gln
```

```
                385                 390                 395                 400
Ser Leu Leu Tyr Thr Asn Gly Lys Thr Tyr Leu Asn Trp Leu Leu Gln
                    405                 410                 415

Arg Pro Gly Gln Ser Pro Lys Arg Leu Ile Tyr Leu Val Ser Lys Leu
                420                 425                 430

Asp Ser Gly Val Pro Asp Arg Phe Ser Gly Ser Gly Ser Gly Thr Asp
            435                 440                 445

Phe Thr Leu Lys Ile Ser Arg Val Glu Ala Glu Asp Leu Gly Val Tyr
        450                 455                 460

Tyr Cys Leu Gln Ser Ser His Phe Pro His Thr Phe Gly Ser Gly Thr
465                 470                 475                 480

Lys Leu Glu Ile Lys
                485

<210> SEQ ID NO 27
<211> LENGTH: 5
<212> TYPE: PRT
<213> ORGANISM: Artificial Sequence
<220> FEATURE:
<223> OTHER INFORMATION: Recombinant sequence

<400> SEQUENCE: 27

Gly Gly Gly Gly Ser
1               5

<210> SEQ ID NO 28
<211> LENGTH: 10
<212> TYPE: PRT
<213> ORGANISM: Artificial Sequence
<220> FEATURE:
<223> OTHER INFORMATION: Recombinant sequence

<400> SEQUENCE: 28

Gly Gly Gly Gly Ser Gly Gly Gly Gly Ser
1               5                   10

<210> SEQ ID NO 29
<211> LENGTH: 15
<212> TYPE: PRT
<213> ORGANISM: Artificial Sequence
<220> FEATURE:
<223> OTHER INFORMATION: Recombinant sequence

<400> SEQUENCE: 29

Gly Gly Gly Gly Ser Gly Gly Gly Gly Ser Gly Gly Gly Gly Ser
1               5                   10                  15

<210> SEQ ID NO 30
<211> LENGTH: 443
<212> TYPE: PRT
<213> ORGANISM: Artificial Sequence
<220> FEATURE:
<223> OTHER INFORMATION: Recombinant sequence

<400> SEQUENCE: 30

Asp Val Gln Leu Gln Glu Ser Gly Pro Gly Leu Val Lys Pro Ser Gln
1               5                   10                  15

Ser Leu Ser Leu Thr Cys Thr Val Thr Gly Tyr Ser Ile Thr Ser Asp
                20                  25                  30

Tyr Ala Trp Asn Trp Ile Arg Gln Phe Pro Gly Asn Lys Leu Glu Trp
            35                  40                  45

Leu Gly Tyr Ile Ser Tyr Ser Gly Asn Thr Tyr Tyr Asn Pro Ser Leu
```

```
            50                  55                  60
Lys Ser Arg Ile Ser Ile Thr Arg Asp Thr Ser Lys Asn Gln Phe Phe
 65                  70                  75                  80

Leu His Leu Asn Ser Val Thr Glu Asp Thr Ala Thr Tyr Tyr Cys
                     85                  90                  95

Ala Gly Asn Tyr Val Arg Trp Gly Gln Gly Thr Leu Val Thr Val Ser
                100                 105                 110

Ala Ala Lys Thr Thr Ala Pro Ser Val Tyr Pro Leu Ala Pro Val Cys
                115                 120                 125

Gly Asp Thr Thr Gly Ser Ser Val Thr Leu Gly Cys Leu Val Lys Gly
                130                 135                 140

Tyr Phe Pro Glu Pro Val Thr Leu Thr Trp Asn Ser Gly Ser Leu Ser
145                 150                 155                 160

Ser Gly Val His Thr Phe Pro Ala Val Leu Gln Ser Asp Leu Tyr Thr
                165                 170                 175

Leu Ser Ser Ser Val Thr Val Thr Ser Ser Thr Trp Pro Ser Gln Ser
                180                 185                 190

Ile Thr Cys Asn Val Ala His Pro Ala Ser Ser Thr Lys Val Asp Lys
                195                 200                 205

Lys Ile Glu Pro Arg Gly Pro Thr Ile Lys Pro Cys Pro Pro Cys Lys
210                 215                 220

Cys Pro Ala Pro Asn Leu Leu Gly Gly Pro Ser Val Phe Ile Phe Pro
225                 230                 235                 240

Pro Lys Ile Lys Asp Val Leu Met Ile Ser Leu Ser Pro Ile Val Thr
                245                 250                 255

Cys Val Val Val Asp Val Ser Glu Asp Asp Pro Asp Val Gln Ile Ser
                260                 265                 270

Trp Phe Val Asn Asn Val Glu Val His Thr Ala Gln Thr Gln Thr His
                275                 280                 285

Arg Glu Asp Tyr Asn Ser Thr Leu Arg Val Val Ser Ala Leu Pro Ile
                290                 295                 300

Gln His Gln Asp Trp Met Ser Gly Lys Glu Phe Lys Cys Lys Val Asn
305                 310                 315                 320

Asn Lys Asp Leu Pro Ala Pro Ile Glu Arg Thr Ile Ser Lys Pro Lys
                325                 330                 335

Gly Ser Val Arg Ala Pro Gln Val Tyr Val Leu Pro Pro Glu Glu
                340                 345                 350

Glu Met Thr Lys Lys Gln Val Thr Leu Thr Cys Met Val Thr Asp Phe
                355                 360                 365

Met Pro Glu Asp Ile Tyr Val Glu Trp Thr Asn Asn Gly Lys Thr Glu
370                 375                 380

Leu Asn Tyr Lys Asn Thr Glu Pro Val Leu Asp Ser Asp Gly Ser Tyr
385                 390                 395                 400

Phe Met Tyr Ser Lys Leu Arg Val Glu Lys Lys Asn Trp Val Glu Arg
                405                 410                 415

Asn Ser Tyr Ser Cys Ser Val Val His Glu Gly Leu His Asn His His
                420                 425                 430

Thr Thr Lys Ser Phe Ser Arg Thr Pro Gly Lys
                435                 440
```

<210> SEQ ID NO 31
<211> LENGTH: 219
<212> TYPE: PRT
<213> ORGANISM: Artificial Sequence

```
<220> FEATURE:
<223> OTHER INFORMATION: Recombinant sequence

<400> SEQUENCE: 31

Asp Val Val Met Thr Gln Thr Pro Leu Thr Leu Ser Val Thr Ile Gly
1               5                   10                  15

Gln Pro Ala Ser Ile Ser Cys Lys Ser Ser Gln Ser Leu Leu Tyr Thr
                20                  25                  30

Asn Gly Lys Thr Tyr Leu Asn Trp Leu Leu Gln Arg Pro Gly Gln Ser
            35                  40                  45

Pro Lys Arg Leu Ile Tyr Leu Val Ser Lys Leu Asp Ser Gly Val Pro
        50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Leu Gln Ser
                85                  90                  95

Ser His Phe Pro His Thr Phe Gly Ser Gly Thr Lys Leu Glu Ile Lys
                100                 105                 110

Arg Ala Asp Ala Ala Pro Thr Val Ser Ile Phe Pro Pro Ser Ser Glu
            115                 120                 125

Gln Leu Thr Ser Gly Gly Ala Ser Val Val Cys Phe Leu Asn Asn Phe
        130                 135                 140

Tyr Pro Lys Asp Ile Asn Val Lys Trp Lys Ile Asp Gly Ser Glu Arg
145                 150                 155                 160

Gln Asn Gly Val Leu Asn Ser Trp Thr Asp Gln Asp Ser Lys Asp Ser
                165                 170                 175

Thr Tyr Ser Met Ser Ser Thr Leu Thr Leu Thr Lys Asp Glu Tyr Glu
                180                 185                 190

Arg His Asn Ser Tyr Thr Cys Glu Ala Thr His Lys Thr Ser Thr Ser
            195                 200                 205

Pro Ile Val Lys Ser Phe Asn Arg Asn Glu Cys
        210                 215

<210> SEQ ID NO 32
<211> LENGTH: 10
<212> TYPE: PRT
<213> ORGANISM: Artificial Sequence
<220> FEATURE:
<223> OTHER INFORMATION: Recombinant sequence

<400> SEQUENCE: 32

Val Ala Ala Ala His His His His His His
1               5                   10
```